United States Patent
Pendas et al.

(10) Patent No.: US 12,029,344 B2
(45) Date of Patent: Jul. 9, 2024

(54) SYSTEM AND METHOD FOR AUTOMATED BREW CYCLES

(71) Applicant: Meticulous Home, Inc., Claymont, DE (US)

(72) Inventors: Juan Carlos Lopez Pendas, Puebla (MX); Uriel Guerrero Pastrana, Puebla (MX); Javier Alejandro Esparza Solis, Puebla (MX); Xavier González de la Cruz, Puebla (MX); Josué Vergara Flores, Puebla (MX); Maria del Carmen Ramirez Franco, Puebla (MX)

(73) Assignee: Meticulous Home, Inc., Claymont, DE (US)

( * ) Notice: Subject to any disclaimer, the term of this patent is extended or adjusted under 35 U.S.C. 154(b) by 0 days.

(21) Appl. No.: 18/129,592

(22) Filed: Mar. 31, 2023

(65) Prior Publication Data
US 2023/0371736 A1    Nov. 23, 2023

Related U.S. Application Data

(60) Provisional application No. 63/326,604, filed on Apr. 1, 2022, provisional application No. 63/420,241, filed on Oct. 28, 2022.

(51) Int. Cl.
*A47J 31/52* (2006.01)
*A47J 31/06* (2006.01)
*A47J 31/44* (2006.01)

(52) U.S. Cl.
CPC ....... *A47J 31/5253* (2018.08); *A47J 31/0663* (2013.01); *A47J 31/446* (2013.01); *A47J 31/521* (2018.08); *A47J 31/5251* (2018.08)

(58) Field of Classification Search
CPC .... A47J 31/02; A47J 31/4482; A47J 31/4485; A47J 31/60; A47J 31/469; A47J 31/061; A47J 45/10; A47J 36/10
(Continued)

(56) References Cited

U.S. PATENT DOCUMENTS

| 8,663,724 B1 | 3/2014 | Banasik |
| 2008/0276807 A1 | 11/2008 | Righetti |

(Continued)

FOREIGN PATENT DOCUMENTS

| DE | 202020103163 | * | 7/2020 | ............. A47J 31/36 |
| DE | 202020103163 U | | 7/2020 | |

OTHER PUBLICATIONS

International Search Report and Written Opinion for International Patent Application No. PCT/US23/17147 mailed on Aug. 22, 2023; 12 pages.

(Continued)

*Primary Examiner* — Phuong T Nguyen
(74) *Attorney, Agent, or Firm* — Run8 Patent Group, LLC; Peter Miller

(57) ABSTRACT

A system includes: a water reservoir configured to store water; a brew chamber extending below and contiguous with the water reservoir; a piston configured to run in the brew chamber, defining a base of the water reservoir, defining a port extending between the water reservoir and the brew chamber, and including a valve coupled to the fill port and operable in a) a closed position during downward advancement of the piston and b) an open position during upward retraction of the piston; a heating element configured to heat water occupying the brew assembly; and an actuator configured to retract the piston to transfer water from the water reservoir, through piston via the port, and into the brew chamber and to advance the piston by a target piston travel (Continued)

distance—corresponding to a piston swept volume that yields a target brew volume—to displace liquid from the brew chamber.

16 Claims, 5 Drawing Sheets

(58) Field of Classification Search
USPC .................. 99/323, 279, 290, 293, 295, 282
See application file for complete search history.

(56) References Cited

U.S. PATENT DOCUMENTS

| | | |
|---|---|---|
| 2011/0086148 A1 | 4/2011 | Ford |
| 2011/0283889 A1* | 11/2011 | Con ........................ A47J 31/42 |
| | | 99/286 |
| 2014/0314921 A1* | 10/2014 | Kuempel ................ H04L 67/10 |
| | | 426/433 |
| 2017/0079465 A1 | 3/2017 | Nichols et al. |

OTHER PUBLICATIONS

Notification of the International Application No. and of the International Filing Date for International Patent Application No. PCT/US23/17147 mailed on Apr. 18, 2023; 1 page.

* cited by examiner

SYSTEM AND METHOD FOR AUTOMATED BREW CYCLES

CROSS-REFERENCE TO RELATED APPLICATIONS

This application claims the benefit of U.S. Provisional Application No. 63/326,604, filed on 1 Apr. 2022, and U.S. Provisional Application No. 63/420,241, filed on 28 Oct. 2022, each of which is herein incorporated in its entirety by this reference.

TECHNICAL FIELD

This invention relates generally to the field of brewing machines and more specifically to a new and useful system and methods for automated brew cycles, controls, and interfaces in the field of brewing machines.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
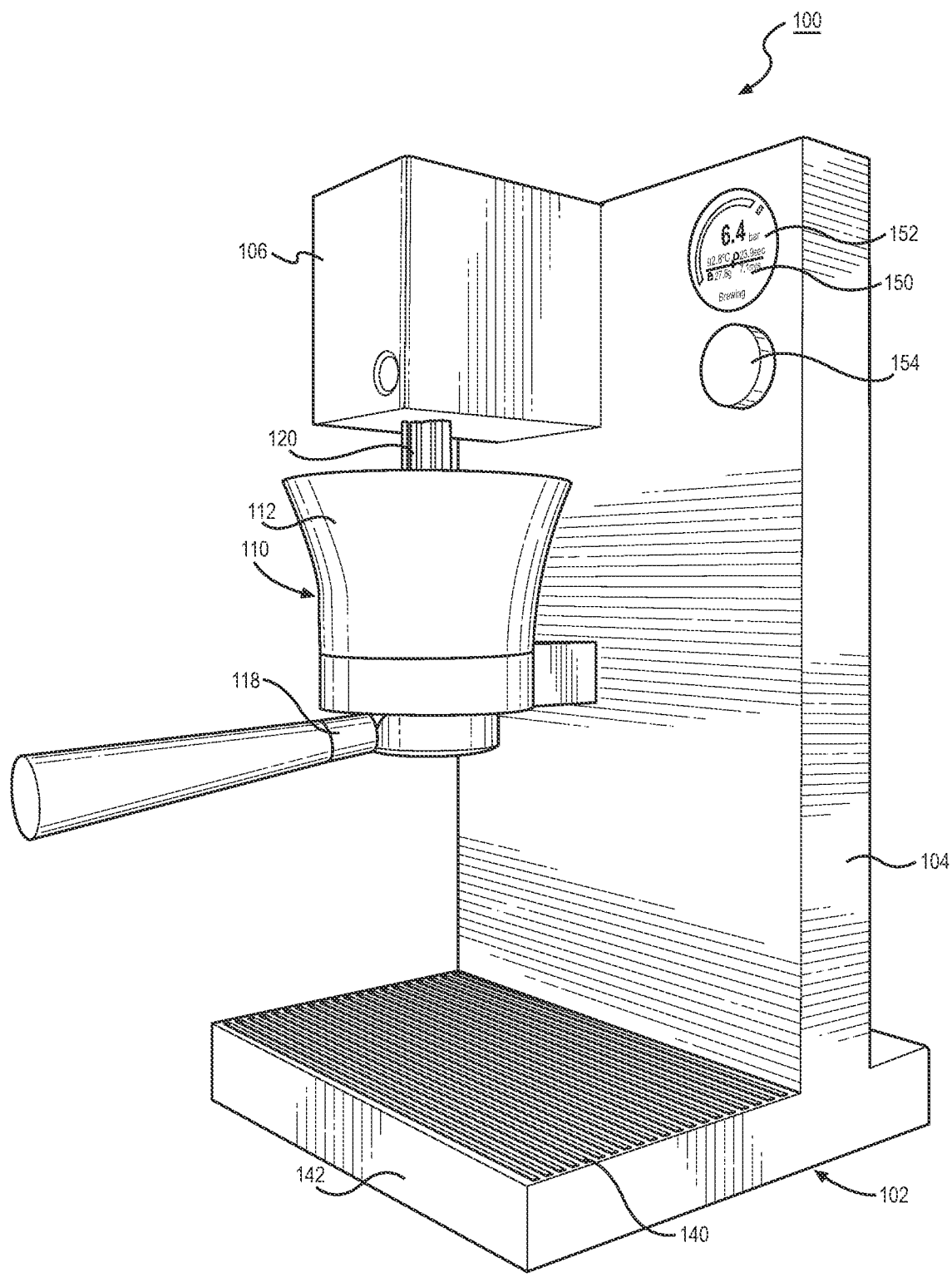
FIG. 1 is a schematic representation of the system.
Figure 2:
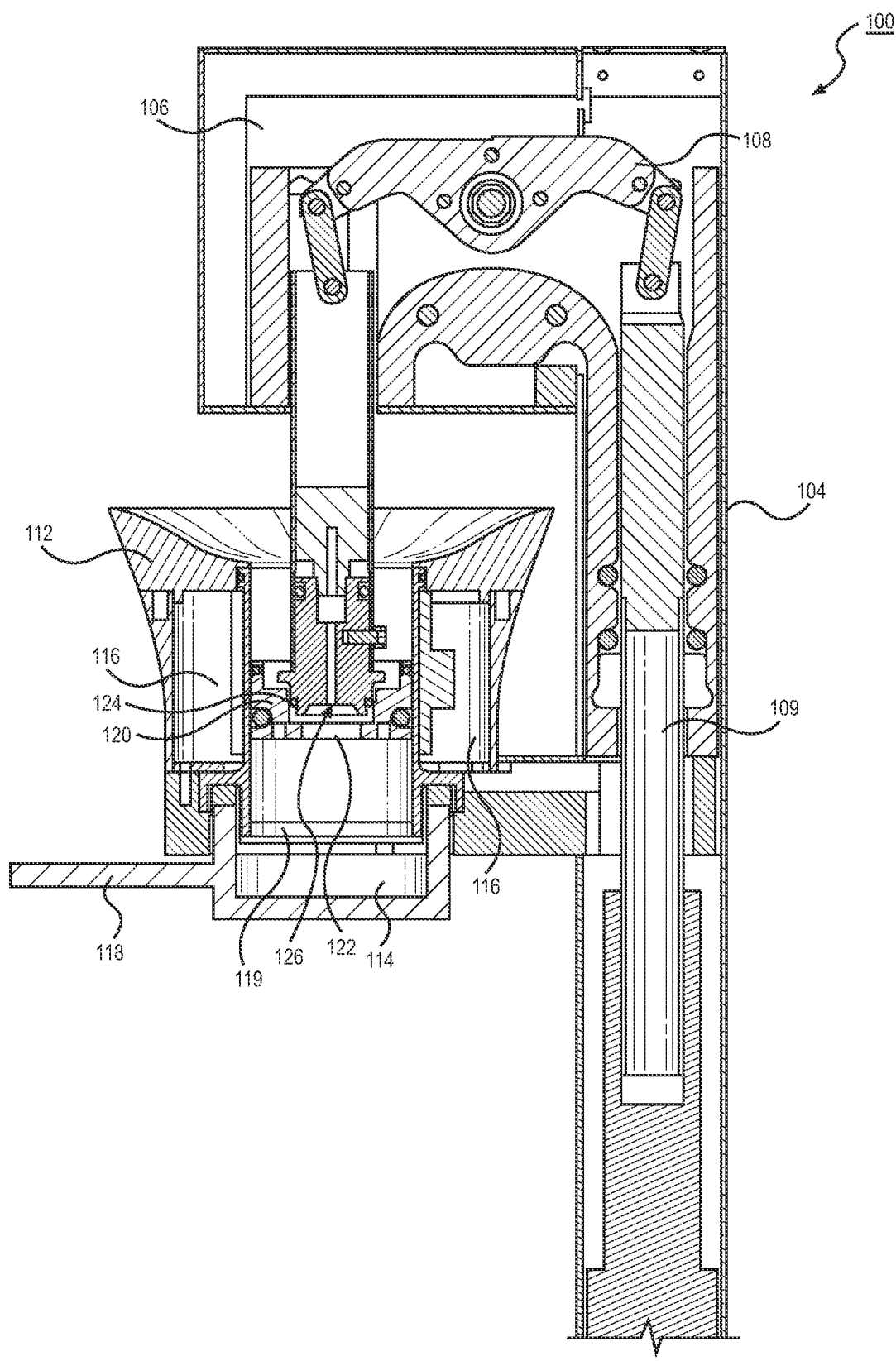
FIG. 2 is a schematic representation of one variation of system.
Figure 3:
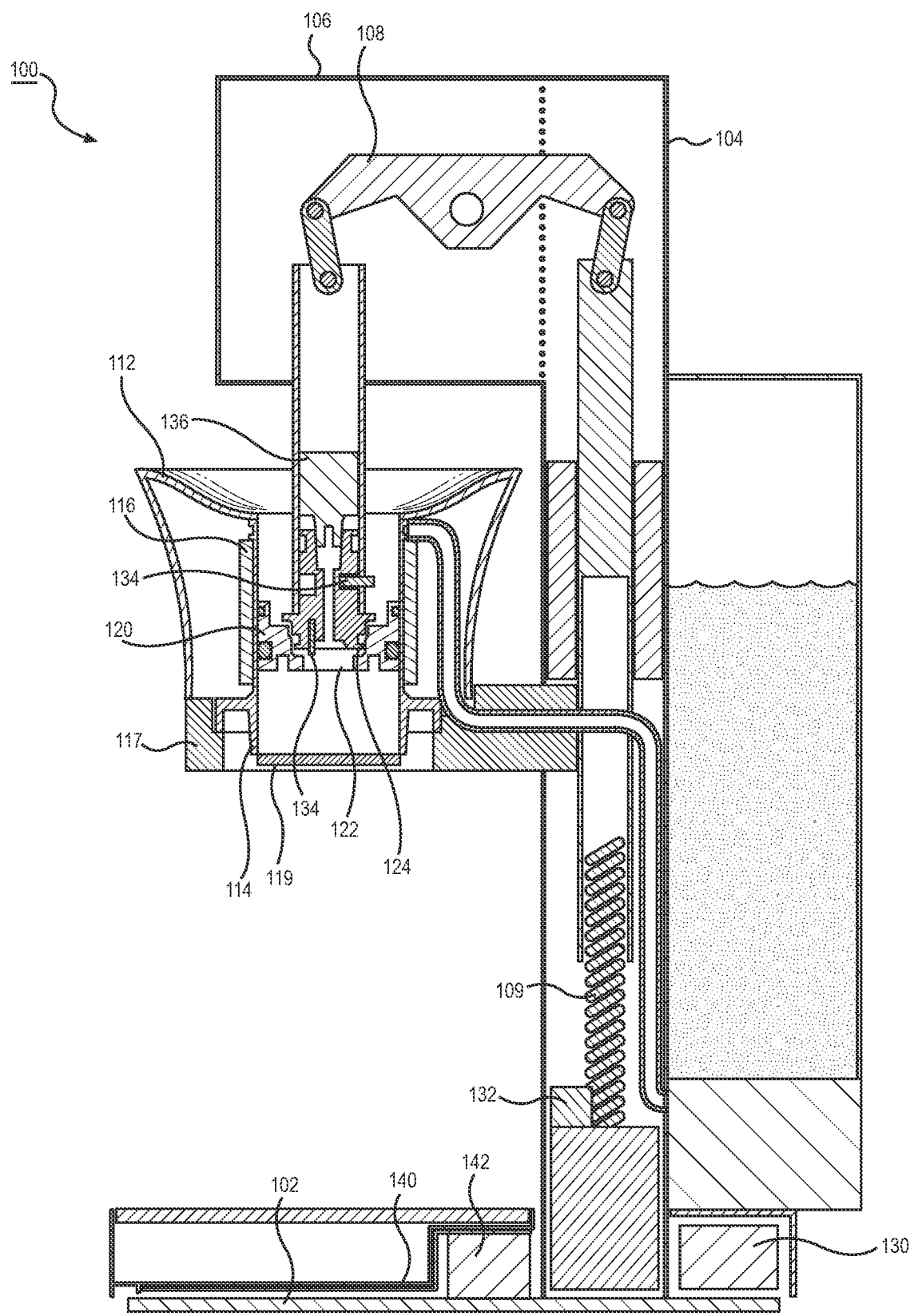
FIG. 3 is a schematic representation of one variation of the system.

As shown in FIGS. 1, 2, and 3, a system 100 includes: abase 102 defining a drip tray 140 and including a scale 142; a column 104 arranged on the base 102; a rocker box 106 extending from a front face of the column 104 and arranged over the base 102; and a brew assembly 110 supported on the column 104 interposed between the base 102 and the rocker box 106, and including a funnel, a brew chamber 114 extending below the funnel, and a portafilter 118 configured to transiently install across a base 102 of the brew chamber 114 opposite the funnel.

The system 100 further includes: a piston 120 configured to run in the brew chamber 114 and forming a position-controlled valve 124 operable in a closed position during downward advancement of the piston 120 in the brew chamber 114 to pressurize the brew chamber 114 and prevent flow of water, located between the funnel and the piston 120, from flowing into the brew chamber 114, and an open position during upward retraction of the piston 120 in the brew chamber 114 to draw water, located between the funnel and the piston 120, into the brew chamber 114. The system 100 further includes: a position sensor 132 configured to output a position signal representing a height of the piston 120 within the brew chamber 114; an actuator 109 arranged in the column 104; and a linkage coupling the actuator 109 to the piston 120, and including a rocker arranged in the rocker box 106.

The system 100 further includes: a heating element 116 arranged in the brew assembly 110 between the funnel and the portafilter 118 and configured to heat a volume of water occupying the brew assembly 110 between the funnel and the piston 120; a temperature sensor 134 coupled to the piston 120 and configured to output a temperature signal representing a temperature of the volume of water inside the brew chamber 114; and a pressure sensor 136 coupled to the piston 120 and configured to output a pressure signal representing a pressure within the brew chamber 114.

The system 100 further includes: a controller 130 configured to trigger the actuator 109 to advance the piston 120 downward within the brew chamber 114 to locate the valve 124 in the closed position; and, during a brew cycle, following insertion of the volume of water into the funnel, the volume of water at an initial temperature and located above the piston 120 opposite the brew chamber 114, activate the heating element 116 to heat the volume of water to a brew temperature. The controller 130 is further configured to: in response to the volume of water reaching the brew temperature, trigger the actuator 109 to retract the piston 120 upward, to a target displacement based on the position sensor 132 and corresponding to the volume of water, within the brew chamber 114 to locate the valve 124 in the opened position; trigger the actuator 109 to drive the piston 120 downward within the brew chamber 114 at a target pressure to push the volume of water through the portafilter 118 and dispense the volume of coffee into a vessel arranged on the drip tray 140 of the base 102; measure a weight of the vessel via the scale 142; and, in response to the weight of the vessel reaching a target vessel weight during the brew cycle, trigger the actuator 109 to discontinue advancement of the piston 120 at the target pressure to terminate the brew cycle.

1.1 Variation

As shown in FIGS. 1, 2, and 3, one variation of the system 100 includes: a base 102; a rocker box 106; a column 104; a brew assembly 110; a piston 120; an actuator 109; a heating element 116; a position sensor 132; a set of temperature sensors 134; a pressure sensor 136; and a controller 130.

In this variation, the rocker box 106 houses a rocker arm 108 and the column 104 supports the rocker box 106 above the base 102.

The brew assembly 110 is supported on the column 104 between the base 102 and the rocker box 106. The brew assembly 110 includes: a water reservoir 112 configured to store a first volume of water; a brew chamber 114 defining a internal cylindrical wall, extending below water reservoir 112, and contiguous with the water reservoir 112; a set of mating features 117 arranged below the brew chamber 114 opposite the water reservoir 112; and a portafilter 118 configured to transiently couple to the set of mating features 117.

The piston 120 is configured to run in the brew chamber 114, is coupled to the rocker arm 108, and defines a fill port 122 extending between the water reservoir 112 and the brew chamber 114. A valve 124 is coupled to the fill port 122 and operable in both a closed position during downward advancement of the piston 120 within the brew chamber 114 and an open position during upward retraction of the piston 120 within the brew chamber 114.

The actuator 109 is arranged in the column 104 and coupled to the rocker arm 108.

The heating element 116 is arranged in the brew assembly 110 and configured to heat the first volume of water occupying the brew assembly 110.

The position sensor 132 is configured to output a position signal representing a position of the piston 120 within the brew assembly 110.

The set of temperature sensors 134 is configured to output a set of temperature signals representing a temperature of the first volume of water occupying the brew assembly 110.

The pressure sensor 136 is configured to output a pressure signal representing a pressure within the brew chamber 114 between the piston 120 and the portafilter 118.

The controller 130 is configured to activate the heating element 116 and, in response to the temperature of the first volume of water reaching a target temperature, trigger the actuator 109 to retract the piston 120 by a target retraction distance to transfer water from the water reservoir 112 through the fill port 122 and into the brew chamber 114, the target retraction distance corresponding to a swept piston 120 volume approximating a target brew volume. The controller 130 is also configured to trigger the actuator 109 to advance the piston 120 by a target piston advance distance to displace liquid from the brew chamber 114 and through the portafilter 118 toward the base 102.

1.2 Variation

Another variation of the system 100 includes: a base; a rocker arm 108; a column 104 supporting the rocker arm 108 above the base; a brew assembly 110; a piston 120; an actuator 109; a heating element 116; a temperature sensor 134; and a controller 130.

In this variation, the brew assembly 110 is supported on the column 104 between the base 102 and the rocker arm 108 and includes: a water reservoir 112 configured to store a first volume of water; a brew chamber 114 defining a cylindrical internal wall, extending below water reservoir 112, and contiguous with the water reservoir 112; a set of mating features arranged below the brew chamber 114 opposite the water reservoir 112; and a portafilter 118 configured to transiently couple to the set of mating features.

In this variation, the piston 120: is configured to run in the brew chamber 114; is coupled to the rocker arm 108; defines a fill port 122: extending between the water reservoir 112 and the brew chamber 114; and includes a valve coupled to the fill port and operable in a) a closed position during downward advancement of the piston 120 within the brew chamber 114 and b) an open position during upward retraction of the piston 120 within the brew chamber 114.

In this variation, the actuator 109: is arranged in the column 104; and is coupled to the rocker arm 108.

In this variation, the heating element 116: is arranged in the brew assembly 110; and is configured to heat the first volume of water occupying the brew assembly 110.

In this variation, the temperature sensor 134 is configured to output a temperature signal representing a temperature of the first volume of water occupying the brew assembly 110.

In this variation, the controller 130 is configured to: activate the heating element 116; in response to the temperature of the first volume of water reaching a target temperature, trigger the actuator 109 to retract the piston 120 to transfer water from the water reservoir 112 through the fill port 122 and into the brew chamber 114; and trigger the actuator 109 to advance the piston 120 to displace liquid from the brew chamber 114 and through the portafilter 118 toward the base 102.

1.3 Variation

In a similar variation, the system 100 includes: a column 104; a brew assembly 110; a piston; an actuator; a heating element 116; a temperature sensor 134; and a controller 130.

In this variation, the brew assembly 110 is supported on the column 104 and includes: a water reservoir 112 configured to store a first volume of water; and a brew chamber 114 defining a cylindrical internal wall, extending below water reservoir 112, and contiguous with the water reservoir 112.

In this variation, the piston 120: is configured to run in the brew chamber 114; defines a fill port 122 extending between the water reservoir 112 and the brew chamber 114; and includes a valve coupled to the fill port 122 and operable in a) a closed position during downward advancement of the piston 120 within the brew chamber 114 and b) an open position during upward retraction of the piston 120 within the brew chamber 114.

In this variation, the actuator 109 is supported on the column 104 and is coupled to the piston 120.

In this variation, the heating element 116: is arranged in the brew assembly 110; and is configured to heat the first volume of water occupying the brew assembly 110.

In this variation, the temperature sensor 134 is configured to output a temperature signal representing a temperature of the first volume of water occupying the brew assembly 110.

In this variation, the controller 130 is configured to: activate the heating element 116; in response to the temperature of the first volume of water approaching a target temperature, trigger the actuator 109 to retract the piston 120 by a target piston travel distance to transfer water from the water reservoir 112, through the piston 120 via the fill port, and into the brew chamber 114, the target piston travel distance corresponding to a piston swept volume that yields a target brew volume; and trigger the actuator 109 to advance the piston 120 by the target piston travel distance to displace liquid from the brew chamber 114.

Additionally or alternatively, in this variation, the controller 130 is configured to, during a brew cycle: activate the heating element 116; trigger the actuator 109 to retract the piston 120 to a) transfer water from the water reservoir 112, through the piston 120 via the port, and into the brew chamber 114 and to b) wet coffee grounds contained in the portafilter 118 below the piston 120 and the brew chamber 114; and trigger the actuator 109 to advance the piston 120 by a target piston travel distance to displace liquid from the brew chamber 114, the target piston travel distance corresponding to a piston swept volume that yields a target brew volume.

2. Applications

Generally, the system 100 is configured to automate brew cycles for batches of coffee. Generally, the system 100 includes: an actuator 109; a brew chamber 114 configured to accept a volume of water; and a heating element 116 arranged around the brew chamber 114 to heat the volume of water. During a brew cycle, responsive to actuation of the actuator 109 in a first direction (e.g., a downward motion), the system 100 can transfer the heated water into the brew chamber 114. During the brew cycle, responsive to actuation of the actuator 109 in a second direction opposite the first direction (e.g., an upward motion), the system 100 can dispense a batch of brewed coffee out of the brew chamber 114 into a cup arranged below the brew chamber 114.

In one implementation, the system 100 includes: a base 102; a column 104 arranged on the base 102; and a rocker box 106 extending from a front face of the column 104 and arranged over the base 102. The system 100 further includes: a brew assembly 110 supported on the column 104 and interposed between the base 102 and the rocker box 106; a funnel; a brew chamber 114 extending below the funnel; and a portafilter 118 configured to install across a base 102 of the brew chamber 114. The brew assembly 110 is configured to receive a volume of water via the funnel and to store and/or heat this volume of water directly above the brew chamber 114 in preparation for subsequent brewing with a volume of coffee grounds or other brew ingredients (e.g., tea leaves) contained in the portafilter 118.

The system 100 further includes: a piston 120 configured to run in the brew chamber 114; and including a valve 124 operable in a) an open position during upward retraction of the piston 120 in the brew chamber 114 to enable heated water located above the piston 120 to draw into the brew chamber 114 and b) a closed position during downward advancement of the piston 120 into the brew chamber 114 to force liquid (e.g., coffee, tea) downward through the portafilter 118 and into a vessel below (rather than release liquid upward above the piston 120). More specifically, with the valve 124 in the closed position, the piston 120 can: prevent ingress of water into the brew chamber 114 and into the portafilter 118. With the valve 124 in the closed position, the piston 120 can: push water—occupying the brew chamber 114—across the volume of coffee grounds and through the portafilter 118.

The system 100 also includes: a heating element 116 arranged in the brew assembly 110 between the funnel and the portafilter 118; and configured to heat a volume of water occupying the brew assembly 110 between the funnel and the piston 120 during a brew cycle. Thus, during a brew cycle, the system 100 can control flow of heated water from above the piston 120 into the brew chamber 114 via the valve 124 based on: upward actuation of the piston 120; and flow of brewed liquid (e.g., coffee, tea) out of the brew chamber 114 via the portafilter 118 based on downward actuation of the piston 120. More specifically, retraction (i.e., upward displacement) of the piston 120 from the portafilter 118 creates a vacuum in the brew chamber 114, which opens the valve 124 and draws a volume of water—equivalent to the swept volume of the piston 120 during this upward actuation—from the heated volume above the piston 120, through the valve 124, and into the brew chamber 114. Alternatively, retraction of the piston 120 from the portafilter 118 can mechanically separate a lower section of the piston sealed against a wall of the brew chamber from an upper section of the piston coupled to the rocker arm 108, thereby opening the the fill port 122 in the piston and enabling this volume of water to move from the water reservoir 112, through the fill port 122, and into the brew chamber 114.

Once the piston 120 reaches a retracted position above the portafilter 118, the actuator 109 retains the piston 120 in this retracted position, which prevents further liquid from entering the brew chamber 114 via the valve 124 (unless the liquid cools and reduces in volume, thereby creating a vacuum in the brew chamber 114 that draws water from above the piston 120 into the brew chamber 114 via the valve 124). Furthermore, the valve 124 prevents liquid in the brew chamber 114 from moving from the brew chamber 114 back into the funnel zone arranged above the piston 120 (e.g., if the liquid expands due to further heating within the brew chamber 114).

Subsequent advancement of the piston 120 downward toward the portafilter 118 increases pressure within the brew chamber 114, which closes the valve 124 (if not already closed) and forces liquid in the brew chamber 114 through the portafilter 118, out of the brew chamber 114, and into a vessel (e.g., a coffee mug) below. The system 100 further includes: an actuator 109 (e.g., a linear motor) arranged in the column 104; and a linkage coupling the actuator 109 to the piston 120. Thus, the actuator 109 can retract and advance the piston 120—via the rocker arm 108—to draw water into the brew chamber 114, and then drive (e.g., coffee, tea) out of the brew chamber 114, respectively. More specifically, the actuator 109 can load water into the brew chamber 114: to precisely meter a volume of water entering the brew chamber 114 (i.e., as a function of displacement and swept volume of the piston 120 during retraction); and to then dispense a precise volume of coffee (or tea, etc.) from the brew chamber 114 (i.e., as a function of displacement and swept volume of the piston 120 during advancement). In one variation, the actuator 109 can be mounted over the piston 120 via direct coupling of the actuator 109 to the piston 120. Thus, the actuator 109 can advance and retract the piston 120 to draw water into the brew chamber 114 without the rocker box 106.

The system 100 further includes: a position sensor 132 configured to output a signal representing a position (or "height") of the piston 120 within the brew chamber 114. In this implementation, the system 100 can implement a direct relationship between displacement of the piston 120 indicated by: the position sensor 132; and both a) a volume of water loaded into the brew chamber 114 at the beginning of a brew cycle and b) a volume of water dispensed from the brew chamber 114 at the end of the brew cycle. Thus, the system 100 can: meter water input and liquid output during a single brew cycle; and meter consistency across many brewing cycles based solely on piston 120 positions detected via the position sensor 132. Therefore, the system 100 can meter water input and liquid output with an actuator 109 and a single position sensor 132 (e.g., rather than with multiple pumps, actuators, flow meters, and/or other complex and space-filling sensors and actuators).

The system 100 further includes: a pressure sensor 136 coupled to the piston 120 and configured to output a pressure signal representing a pressure within the brew chamber 114. In this implementation, the system 100 can monitor a pressure inside the brew chamber 114 based on a pressure signal according to the pressure sensor 136. More specifically, as the piston 120 advances in the downward direction, the pressure sensor 136 can output the pressure signal indicative of a pressure differential (e.g., an increase) in the brew chamber 114. Thus, the system 100 can control brew cycle parameters (e.g., a water flow rate, a flavor profile, water pressure) based on the pressure within the brew chamber 114 during a brew cycle. In one variation, the system 100 can measure pressure within the brew chamber 114 during a brew cycle by computing an electromechanical force metric and/or a torque output metric based on the linear actuator 109.

2.1 Methods

Generally, the system 100 includes a controller 130 configured to automate a brew cycle. In one implementation, prior to a brew cycle, the controller 130 can trigger the actuator 109 to advance the piston 120 downward to a brew cycle start position within the brew chamber 114, thereby setting the valve 124 in the piston to a closed position.

At the start of a subsequent brew cycle, a user may: pour a volume of water (e.g., between 1 and 5 fluid ounces) at an unknown initial temperature into the brew assembly 110 via the funnel; load coffee grounds into the portafilter 118; and install the portafilter 118 into the base of the brew assembly 110. The brew assembly 110 thus initially stores this volume of water in the water reservoir 112 above the piston. The controller 130 can then: initiate a brew cycle, such as in response to manual selection of a "start" or "brew" input on a user interface 150 arranged on the system 100; retrieve brew parameters for the brew cycle; activate the heating element 116 to heat the volume of water in the water reservoir 112 to a target brew temperature (e.g., 90-96° C., or 195-205° F.) specified in the brew parameters; and monitor the temperature of this water—stored above the piston 120—via the temperature sensor 134.

Then, in response to the volume of water reaching the target brew temperature, the controller 130 can: trigger the actuator 109 to retract the piston 120 upwardly by a linear distance that corresponds to a swept volume of the piston equal to (or based on) a target brew volume (e.g., for a single coffee serving). Such retraction of the piston 120 opens the valve 124 and draws a volume of heated water—equal to the swept volume of the piston 120 during this retraction motion—from the water reservoir 112 above the piston 120, through the valve 124 in the piston, and into the brew chamber 114. More specifically, the system 100 can retract the piston 120 over the target displacement distance that yields a total swept volume of the piston based on the target volume of coffee output by the system 100 upon completion of the brew cycle, such as: equal to the target volume of coffee; or equal to a sum of the target volume of coffee and a predicted volume of water necessary to saturate coffee grounds occupying the portafilter 118.

As coffee grounds and water in the brew chamber 114 bloom, the system 100 can control pressure within the brew chamber 114 by: monitoring pressure in the brew chamber 114 directly via the pressure sensor 136 in the piston or reading force or torque outputs of the actuator 109 necessary to move the piston over short distances; advancing the piston when this pressure drops below a target brew pressure; and retracting or stopping the piston when this pressure increases above the target brew pressure. The system 100 can also selectively activate the heating element 116 based on outputs of the temperature sensor 134 to maintain liquid in the brew chamber 114 at a target brew temperature as coffee grounds steep in the brew chamber 114 during this bloom period (e.g., of 0-60 seconds).

Upon completion of the bloom period, the controller 130 can: trigger the actuator 109 to advance the piston 120 downwardly by a linear distance that corresponds to a target brew volume (e.g., for a single coffee serving). Such advancement of the piston 120 closes (or ensures closure of) the valve 124 and forces water toward and through the portafilter 118. More specifically, the system 100 can advance the piston 120 over the target displacement distance that yields a total swept volume of the piston equal to the target volume of coffee for the brew cycle.

In one implementation, during the brew cycle, the controller 130 can also trigger the actuator 109 to drive the piston 120 downward within the brew chamber 114 at a speed that yields a target pressure within the brew chamber 114, thereby driving liquid through the portafilter 118—and thus dispensing a volume of coffee into a vessel arranged below (e.g., on the drip tray 140, on the scale 142) at a target dispense pressure that extracts further, select flavors from the coffee grounds.

In one variation in which the system 100 includes a scale 142 arranged on the base during the brew cycle, the controller 130 further: triggers the actuator 109 to advance the piston downwardly following the bloom period; interfaces with the scale 142 to monitor a weight of contents of a vessel arranged on the scale 142 below the portafilter 118; and triggers the actuator 109 to cease advancement of the piston in response to the weight of contents of the vessel—as detected via the scale 142—reaching the target brew volume or a target brew weight (i.e., rather than based on a target displacement distance of the piston).

The system 100 can therefore control water loading and distribution, brew chamber 114 pressure, brew temperature, bloom duration, and output brew volume during a brew cycle autonomously via a single actuator and a heating element 116 and without manual input (e.g., via a lever), thereby maintaining consistent brew parameters across brew cycles.

2.2 Brew Parameters

Generally, coffee bean roasting processes impact flavor profiles of coffee beans and brewed coffee. For example, coffee beans labeled as "dark roast" are roasted for a longer period of time during processing and are therefore consistently bitter in flavor. Similarly, coffee beans labeled as "light roast" are roasted for a shorter period of time during processing and therefore provide a diverse flavor profile including sweetness, acidity, and bitterness. Accordingly, the system 100 can autonomously implement target brew parameters based on a type of coffee loaded into the portafilter 118 and/or based on a predefined or user-defined brew recipe in order to extract a target flavor profile from the coffee. For example, the controller 130 can autonomously directly control brew heating element 116 output power, piston and actuator position, and piston and actuator speed to indirectly control: brew pressure; brew temperature; bloom duration; brew steep volume; and dispense volume.

For example, the system 100 can: receive a set of brew parameters, via a user interface 150 in communication with the controller 130, such as entered manually by a user; retrieve the brew parameters from a recipe selected manually by the user via the user interface 150; retrieve the brew parameters linked to a barcode, quick-response code, or other optical identifier read from a coffee packaging scanned by an optical sensor arranged on the system 100; or download the brew parameters from an active or passive wireless transmitter arranged on a coffee packaging via a wireless receiver in the system 100. The controller 130 can then autonomously implement these brew parameters to brew a volume (e.g., a cup) of coffee, such as once the user installs the portafilter 118 and loads a volume of water in the water reservoir 112 in the brew assembly 110.

3. Body/Housing

Generally, the system 100 includes a column 104 arranged over a base 102 (e.g., platform). In particular, the column 104 and the base cooperate to form a housing configured: to support a vessel (e.g., a coffee mug), a scale 142 supporting a vessel as described below, and/or a drip tray 140; to house the actuator 109; to locate the brew assembly 110 over the vessel; to support the rocker arm 108—located within a rocker box 106—over the brew assembly 110; to house the actuator 109, which is coupled to the piston in the brew assembly 110 via the rocker arm 108 and a connecting rod, as described below; and to house the controller 130 and a user interface 150.

In one implementation, the system 100 can include: a base 102 defining a drip tray 140 (e.g., a grated tray) configured to collect liquid (e.g., water, coffee); and a column 104 arranged on the base 102 and configured to support a rocker box 106. In this example, the system 100 can further include: the rocker box 106 extending from a front face of the column 104; arranged over the drip tray 140 of the base 102; and configured to enclose the rocker arm 108, which couples the actuator 109 to the piston and translates linear or angular motion of the actuator 109 into translation (i.e., advancement and retraction) of the piston within the brew chamber 114.

For example, the column 104 and the rocker box 106 can be constructed of cast, extruded, and/or billet aluminum, steel (e.g., stainless steel), and/or polymer and can form an assembled or unitary structure. In this example, the base 102 can be constructed of thick-walled or solid steel plate in order to achieve a low center of gravity and thus increase stability of the system 100.

4. Brew Assembly

The brew assembly 110 is supported on the column 104 between the base and the rocker arm 108 and includes: a water reservoir 112 configured to store a first volume of water; a brew chamber 114 defining a cylindrical internal wall, extending below water reservoir 112, and contiguous with the water reservoir 112; a set of mating features arranged below the brew chamber 114 opposite the water reservoir 112; and/or a portafilter 118 configured to transiently couple to the set of mating features.

In particular, the brew assembly 110 can include: a brew chamber 114; a funnel (or other structure) that extends upwardly from the brew chamber 114 to form the water reservoir 112 that is contiguous with the brew chamber 114; and a portafilter 118 configured to load a volume of coffee grounds (or tea leaves, etc.) and to transiently install in the base of the brew chamber 114 opposite the water reservoir 112.

In one implementation, the water reservoir 112 and the brew chamber 114 define a unitary structure, such as a cast, extruded, or billet aluminum or steel structure. The water reservoir 112 and the brew chamber 114 can be cast or machined: to form a cylindrical running surface configured to seal against the piston; to form an internal or external thread in the base of the brew chamber 114 configured to receive the portafilter 118; and to form a set of bores or other receptacles configured to house a set of heating elements 116, such as a set of cartridge heaters.

Furthermore, the piston 120: forms an interface between the water reservoir 112 from the brew chamber 114; defines a bottom of the water reservoir 112; defines a top of the brew chamber 114; and includes a fill port and valve that controls flow of water from the water reservoir 112 into the brew chamber 114. Accordingly, with the piston in a fully-advanced position at the bottom of the brew chamber 114, the brew assembly 110 and the piston can cooperate to define a water reservoir 112 with a total volume approximating and greater than a maximum target brew volume (i.e., a total volume of coffee dispensed by the system 100 during a brew cycle), such as 115-130% of the maximum target brew volume in order to enable the system 100 to both draw sufficient water into the brew chamber 114 to saturate coffee grounds in the portafilter 118 and then output the maximum target brew volume while the coffee grounds remain saturated. Because the maximum total volume of the water reservoir 112 is minimally greater than the maximum target brew volume, the system 100 can thus heat minimally more water than needed for a brew chamber 114, thereby reducing total brew cycle duration, reducing total brew cycle power consumption, and/or enabling integration of smaller, lower-output heating elements 116 and thus a small brew assembly 110 and system size.

In one variation, the system 100 further includes a lid removably or operably arranged over the water reservoir and configured to retain heat within the water reservoir, thereby enabling the system 100 to heat water in the water reservoir to a target brew chamber in less time and/or with a lower total energy consumption.

4.1 Screen

In one variation, the system 100 further includes a screen 119 arranged in the brew chamber 114 adjacent and above the portafilter 118 and configured to: prevent water from flowing from the brew chamber 114 into the portafilter 118 when pressure within the brew chamber 114 remains below a threshold pressure (i.e., prior to downward advancement of the piston); and to distribute water—loaded into the brew chamber 114 between the piston and the screen 119—across coffee grounds occupying the portafilter 118 in response to an increase in pressure within the brew chamber 114 above the threshold pressure during downward advancement of the piston.

The screen 119 defines an array of perforations (or "pores") permeable to water at a target brew temperature under brew chamber 114 pressures greater than ambient pressure. For example, the screen 119 can include a stainless steel sheet defining hundreds or thousands of perforations less than 0.2 micron and uniformly distributed across its area: such that heated water in the brew chamber 114 remains above the screen 119 when pressure in the brew chamber 114 approximates ambient pressure (i.e., prior to downward advancement of the piston during a brew cycle); and such that heated water in the brew chamber 114 flows through all perforations in the screen 119 to uniformly wet grounds in the portafilter 118 when pressure in the brew chamber 114 increases substantially above ambient pressure (i.e., during downward advancement of the piston during the brew cycle). Thus, the screen 119: can prevent water from reaching the coffee grounds in the portafilter 118 until the brew chamber 114 is fully charged with a target volume of water at a target brew temperature; and then distribute this heated water uniformly across the coffee grounds in the portafilter 118—thereby preventing uneven wetting, preventing uneven flavor extraction, and enabling tight control over exposure duration of water to coffee grounds—when the system 100 subsequently advances the piston downwardly toward the portafilter 118 during the brew chamber 114.

In one implementation, the screen 119 is permanently integrated into the brew chamber 114. In another implementation, the screen 119 is removable from (i.e., transiently located in) the brew chamber 114. For example, the brew assembly 110 can define a shoulder: adjacent and above the portafilter 118; and defining a seat configured to receive and locate the screen 119 above the portafilter 118. In this example, the screen 119 can: thread into the brew assembly 110 to seat against the shoulder; or insert into and clamp against the shoulder to form a perimeter seal against the brew chamber 114.

5. Piston

The piston: is configured to run in the brew chamber 114; is coupled to the rocker arm 108; defines a fill port extending between the water reservoir 112 and the brew chamber 114; and includes a valve coupled to the fill port and operable in a) a closed position during downward advancement of the piston within the brew chamber 114 and b) an open position during upward retraction of the piston within the brew chamber 114.

Generally, the piston 120 is configured to run vertically within and to seal against the cylindrical bore of the brew chamber 114. The piston further includes: a fill port extending from the top of the piston to the bottom of the piston; and a one-way valve arranged in the fill port. The valve 124 is configured: to permit water to flow from the water reservoir 112 above the piston, through the fill port in the piston, and into the brew chamber 114 below the piston (e.g., when pressure in the brew chamber 114 is less than ambient pressure; when the piston is retracted upwardly in the brew chamber 114); and to prevent water from flowing from the brew chamber 114 back into the water reservoir 112 (e.g., when pressure in the brew chamber 114 is greater than ambient pressure; when the piston is advanced downwardly in the brew chamber 114).

For example, the piston can be molded, cast, machined, or otherwise fabricated in steel, aluminum, polymer, or other food-safe material.

5.1 Valve

In particular, the piston 120: is configured to run vertically in the brew chamber 114; and includes a valve 124 operable between a closed position and an open position. The valve 124 is operable in the open position during upward retraction of the piston 120 within the brew chamber 114, thereby enabling reduced pressure in the brew chamber 114 to draw water—stored in the water reservoir 112—through the fill port in the piston 120 and into the brew chamber 114. Thus, as the piston 120 is retracted in the upward direction within the brew chamber 114, the valve 124 can open to permit the system 100 to draw water from the water reservoir 112 into the brew chamber 114. The valve 124 is further operable in the closed position during downward advancement of the piston within the brew chamber 114 in order to enable the system 100 to pressurize the brew chamber 114 and to prevent flow of additional water—stored in the water reservoir 112—from flowing into the brew chamber 114. Thus, while the piston 120 is advanced, the valve 124 remains in the closed position.

In one implementation, the valve 124 includes a check valve 124 (e.g., a ball check valve 124) to control water flow (e.g., unidirectional flow) down into the brew chamber 114 (rather than release liquid upward). For example, the valve 124 can include a straight-through check-valve: arranged in the piston and fluidly coupled to the fill port; configured to transition into the closed position in response to an increase in pressure in the brew chamber 114 during downward advancement of the piston; and configured to transition into the open position in response to a decrease in pressure in the brew chamber 114 during upward retraction of the piston. Thus, the valve 124 can define a pressure-controlled valve 124 to control flow of water into the brew chamber 114 according to a water pressure in the check valve 124.

In another implementation shown in FIG. 3, the piston and the valve 124 are contiguous. In this implementation, the piston: includes a lower piston section sealed against a wall of the brew chamber 114 and defining the fill port; and an upper piston section coupled to the rocker arm 108 via a connecting rod and mechanically coupled to the lower piston section. When the actuator 109 advances the piston, the upper piston section: drives against the lower piston section and seals against the fill port, thereby preventing liquid from moving between the water reservoir 112 and the brew chamber 114; and drives the lower piston section downwardly in the brew chamber 114, thereby increasing pressure in the brew chamber 114. Conversely, when the actuator 109 retracts the piston, the upper piston section: retracts from the lower piston section and unseals from the fill port, thereby enabling water to move from the water reservoir 112 into the brew chamber 114; and lifts the lower piston section upwardly in the brew chamber 114, thereby drawing water from the water reservoir 112 into the brew chamber 114.

In a similar example, the piston includes a lower piston section configured to seal against an internal cylindrical internal wall of the brew chamber and defining the fill port. In this example, the valve includes an upper piston section interposed between the actuator and the lower piston section. In this example, in response to downward advancement of the piston, the upper piston section can: seal over the fill port in the lower piston section to set the valve in the closed position; and drive the lower piston section downwardly in the brew chamber. Similarly, in response to upward retraction of the piston, the upper piston section can: retract from the lower piston section to open the the fill port to the water reservoir and to set the valve in the open position; and lift the piston upwardly in the brew chamber.

In one variation, the valve can further function as an over-pressure valve configured to open in response to a pressure in the brew chamber exceeding a maximum brew pressure. Alternatively, the system 100 can include a separate over-pressure valve integrated into the piston or into the brew chamber.

6. Actuator

In one implementation, the system 100 includes an actuator 109 configured to drive the piston 120 within the brew assembly 110. The system 100 can thus control water flow from the water reservoir 112 into the brew chamber 114, liquid flow from the brew chamber 114 into a vessel below, and pressure within the brew chamber 114 solely based on motion of the piston (e.g., position and velocity) set via the actuator 109.

In one implementation shown in FIGS. 2 and 3, the actuator 109 includes a linear actuator arranged in the column 104 below the rocker box 106 and the rocker arm 108. The rocker arm 108: includes a pivot mounted to the column 104 over the brew assembly 110; defines a first end coupled directly to the actuator 109; and defines a second end coupled to the piston via a connecting rod. Thus, in the implementation, the controller 130 can: trigger the actuator 109 to retract, thereby rotating the rocker arm 108 and retracting the piston in the brew chamber 114; and similarly trigger the actuator 109 to extend, thereby rotating the rocker arm 108 and advancing the piston in the brew chamber 114.

Figure 4:
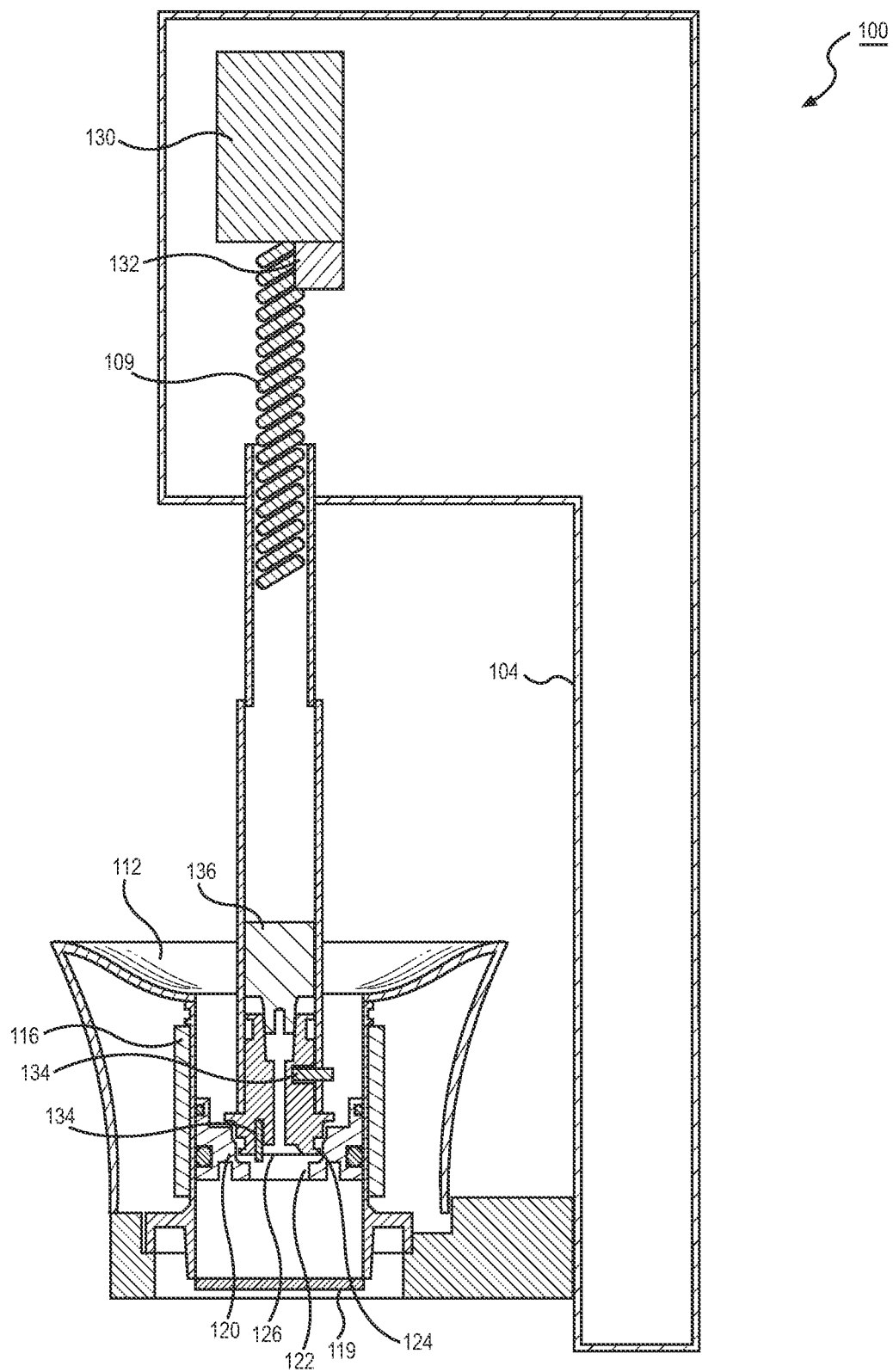
FIG. 4 is a schematic representation of one variation of the system.

In a similar implementation shown in FIG. 4, the actuator 109 includes a linear actuator arranged over the brew assembly 110 and directly coupled to the piston. Thus, in the implementation, the controller 130 can: trigger the actuator 109 to retract, thereby retracting the piston in the brew chamber 114; and similarly trigger the actuator 109 to extend, thereby advancing the piston in the brew chamber 114.

In another implementation, the actuator 109 includes a rotary motor arranged in the column 104 and coupled to the rocker arm 108 via a second connecting rod (and/or a gearbox). Thus, in this implementation, the controller 130 can: trigger the actuator 109 to rotate in a first direction, thereby rotating the rocker arm 108 and retracting the piston in the brew chamber 114; and similarly trigger the actuator 109 to rotate in a second direction, thereby rotating the rocker arm 108 and advancing the piston in the brew chamber 114.

In a similar implementation, the actuator 109 includes a rotary motor: arranged over the brew assembly 110; and including an eccentric crank arranged on an output shaft of the rotary motor and coupled to the piston via a connecting rod. Thus, in this implementation, the controller 130 can: trigger the actuator 109 to rotate in a first direction, retracting the piston in the brew chamber 114; and similarly trigger the actuator 109 to rotate in a second direction, thereby advancing the piston in the brew chamber 114.

However, the actuator 109 can include any other type of actuator coupled to the piston in any other way.

7. Heating Element

The system 100 includes a heating element 116 arranged in (or otherwise coupled to) the brew assembly 110 and configured to heat water occupying the water reservoir 112 and/or the brew chamber 114.

For example, the heating element 116 can include a cartridge heater arranged in a bore or other receptacle in the brew assembly 110, such as adjacent and extending parallel to the axis of the brew chamber 114. In another example, the heating element 116 includes a band heater wrapped around the brew assembly 110.

For example, the water reservoir 112 can be configured to accept a volume of cool water, such as between one and five fluid ounces. At the start of a brew cycle, the controller 130 can activate the heating element 116, which thus heats the brew chamber 114 and water reservoir 112, which thus heats this volume of water. Then, in response to detecting that the volume of water has reached a target brew temperature, the controller 130 can trigger the actuator 109 to retract the piston 120, thereby reducing pressure in the brew chamber 114, opening the valve 124, and drawing a volume of heated water—equal to the swept volume of the piston during this retraction action—from the water reservoir 112 into the brew chamber 114.

Therefore, the system 100 can: reduce brew cycle duration by heating only water contained in the brew assembly 110 (e.g., 1-5 ounces rather than 0.5-1.0 gallon of water); and both preheat water prior to a brew cycle and maintain water and ground temperature during a bloom period within the brew chamber 114 via a single heating element 116 (or a single heating element 116 assembly) integrated into the brew assembly 110.

8. Sensors

The system 100 can further include a set of sensors, such as: a temperature sensor 134 configured to output a temperature signal representing a temperature of water in the water reservoir 112 and/or in the brew chamber 114; a pressure sensor 136 configured to output a pressure signal representing a pressure within the brew chamber 114; and/or a position sensor 132 configured to output a position signal representing a position (or a change in position) of the piston within the brew chamber 114. (In one variation, the system 100 includes additional sensors, such as flow rate, weight, pH, humidity, and/or force sensors configured to output signals representing conditions in the brew chamber 114, ambient conditions, and operational conditions of the system 100 during a brew cycle).

8.1 Temperature Sensor

The system 100 includes a temperature sensor 134 configured to output a temperature signal representing a temperature of a volume of water occupying the brew assembly 110. More specifically, the system 100 can include a set of (i.e., one or more) temperature sensors 134 configured to output temperature signals representing the temperature of the volume of water occupying the brew chamber 114 and/or the water reservoir 112.

In one implementation, the system 100 includes an upper temperature sensor 134 (e.g., a thermocouple): arranged in the piston proximal an upper surface of the piston; and configured to output a first temperature signal representing a temperature of a volume of water occupying the water reservoir 112. In this implementation, the controller 130 can: retrieve a target pre-brew temperature (e.g., 185° F.) in preparation for a brew chamber 114; monitor a temperature of water in the water reservoir 112 based on the temperature signal output by the upper temperature sensor 134; and implement closed-loop controls (e.g., PID control, a bang-bang control) to selectively activate the heating element 116 to heat and maintain this volume of water at the target pre-brew temperature prior to the brew cycle.

In this implementation, because the water reservoir 112 and the brew chamber 114 are contiguous, the water reservoir 112 and the brew chamber 114 are both heated by the heating element 116. Furthermore, because the piston contacts both the water reservoir 112 and the brew chamber 114, the controller 130 can monitor and control temperatures of water in the water reservoir 112 and the brew chamber 114 via a single temperature sensor 134 and the heating element 116.

Additionally or alternatively, in an instance of the system 100 with the screen 119, the system 100 can include a lower temperature sensor 134 (e.g., a second thermocouple): arranged in the piston proximal a lower surface of the piston; and configured to output a second temperature signal representing a temperature of water occupying the brew chamber 114 (i.e., located between the piston and the portafilter 118). In this implementation, the controller 130 can: retrieve a target brew temperature (e.g., 192° F.) from a set of brew parameters, such as predefined for a particular coffee roast; load pre-heated water from the water reservoir 112 into the brew chamber 114 between the piston and the screen 119 by triggering the actuator 109 to retract the piston; monitor a temperature of water in the brew chamber 114 based on the temperature signal output by the lower temperature sensor 134; and activate the heating element 116 to heat this volume of water to the target brew temperature. Upon this water reaching the target brew temperature, the controller 130 can trigger the actuator 109 to advance the piston forward, thereby driving this water through the screen 119, over the grounds, and through the portafilter 118 to complete the brew cycle.

Additionally or alternatively, in an instance of the system 100 without the screen 119, the controller 130 can: retrieve a target bloom temperature (e.g., 192° F.) from the set of brew parameters; load pre-heated water from the water reservoir 112 into the brew chamber 114—and thus in contact with the coffee grounds in the portafilter 118—by triggering the actuator 109 to retract the piston; monitor a temperature of water in the brew chamber 114 based on the temperature signal output by the lower temperature sensor 134; and implement closed-loop controls (e.g., PID control, a bang-bang control) to selectively activate the heating element 116 to heat and maintain this volume of water in the brew chamber 114 at the target bloom temperature during a bloom period, such as defined in the brew parameters. Upon completion of the bloom period (e.g., 30 seconds), the controller 130 can trigger the actuator 109 to advance the piston forward, thereby driving liquid through the portafilter 118 to complete the brew cycle.

Additionally or alternatively, the system 100 can include a temperature sensor arranged in the brew assembly and configured to output temperature values representing temperatures of water in the water reservoir and/or in the brew chamber. However, the system 100 can include any other type, position, or configuration of temperature sensor 134(s) and/or heating elements 116.

8.2 Pressure Sensor

In one variation, the piston further includes a pressure port 126 facing the brew chamber 114. In this variation, the system 100 further includes a pressure sensor 136: arranged in the piston; fluidly coupled to the pressure port 126; and configured to output a pressure signal representing a pressure within the brew chamber 114 between the piston and the portafilter 118 (or between the piston and the screen 119). Generally, in this variation, the system includes a pressure sensor 136 integrated directly into the piston. Accordingly, the controller 130 can: directly monitor a pressure within the brew chamber 114 during a brew cycle based on a pressure signal output by the pressure sensor 136; and implement closed-loop controls to maintain a pressure within the brew chamber 114 by modulating a position of the piston (e.g., during a bloom period), by modulating a velocity of the piston (e.g., while advancing the piston downwardly near a conclusion of a brew cycle), and/or by modulating an output torque or output power of the piston.

In a similar implementation, the pressure port 126 is arranged in a wall of the brew chamber 114; and the pressure sensor 136 is arranged in the brew assembly outside of the brew chamber and fluidly coupled to brew chamber via the pressure port 126.

In another variation, the system 100 includes a force sensor, torque sensor, or physical or virtual load sensor coupled to, arranged on, or integrated into the actuator 109 and configured to output a signal representing a force output of the actuator 109. As described above, the rocker arm 108 includes: a pivot mounted to the column 104; a first end coupled to the actuator 109; and a second end coupled to the piston via a connecting rod. Accordingly, during a brew cycle, the controller 130 can: access a target brew pressure from a set of brew parameters, such as predefined for a particular coffee roast; and monitor a force output of the actuator 109 via this sensor. The controller 130 can then monitor a pressure in the brew chamber 114 based on: the force output of the actuator 109; a stored cross-sectional area of the piston; and a ratio of distances between the pivot, the first end, and the second end of the rocker arm 108. The controller 130 can implement closed-loop controls to maintain the target brew pressure within the brew chamber 114 by modulating the position of the piston (e.g., during a bloom period), by modulating a velocity of the piston (e.g., while advancing the piston downwardly near a conclusion of a brew cycle), and/or by modulating an output torque or output power of the piston.

In a similar implementation, the controller 130 can monitor back-EMF of the actuator 109, derive a force or torque output of the actuator 109 based on back-EMF of the actuator 109, and convert this force or torque output to a pressure in the brew chamber 114.

Additionally or alternatively, the system 100 can include a set of home switches that output signals representing presence of the actuator (or the piston) in maximum extension and retraction positions.

However, the system 100 can include any other type or configuration of physical or virtual pressure sensor 136, and the controller 130 can implement any other methods or techniques to monitor or detect pressure in the brew chamber 114.

8.3 Position Sensor

In another variation, the system 100 includes a position sensor 132 configured to output a position signal representing a position of the piston in the brew chamber 114.

In one implementation, the position sensor 132 includes an angular positions sensor (e.g., a potentiometers) coupled to the rocker arm 108 and configured to output an angular position of the rocker arm 108. Accordingly, in this implementation, the controller 130 can monitor an angular position of the rocker arm 108 via the position sensor 132 and convert this angular position of the rocker arm 108 into a vertical position of the piston in the brew chamber 114 based on a stored geometry of the rocker arm 108 and connecting rod.

In another implementation, the position sensor 132 includes a linear or rotary encoder arranged on the actuator 109. Accordingly, in this implementation, the controller 130 can monitor a length of the actuator 109 via the position sensor 132 and convert this length of the actuator 109 into a vertical position of the piston in the brew chamber 114 based on a stored geometry of the actuator 109, the rocker arm 108, and the connecting rod.

In yet another implementation, the position sensor 132 includes a home sensor (or "home switch"): coupled to the actuator 109 or to the rocker arm 108; and configured to indicate presence of the piston in the home position (e.g., a maximal lower position of the piston in the brew chamber 114). In this implementation, the actuator 109 includes a stepper motor. Accordingly, the controller 130 can: trigger the actuator 109 to move the piston to the home position, such as at the start of a brew chamber 114; then count steps of the stepper motor while moving the piston from the home position; and calculate a distance of the piston from the home position—and thus a position of the piston in the brew chamber 114—based on a known position of the piston at the home position, the step count, and a stored geometry of the actuator 109, the rocker arm 108, and the connecting rod.

However, the system 100 can include any other type or configuration or physical or virtual position sensor, and the controller 130 can implement any other methods or techniques to monitor or detect a position of the piston in the brew chamber 114.

8.4 Scale

In one variation, the base further defines a scale receptacle. In this variation, the system 100 further includes a scale 142 configured to transiently seat in the scale receptacle and to output a weight signal. Generally, in this variation, the scale 142 can be permanently or transiently (i.e., removably) arranged in the base and can output a weight signal representing a weight of an object arranged on the scale 142, such as a coffee mug, prior to a brew cycle or a filled coffee mug upon completion of a brew cycle. Accordingly, in this variation, the controller 130 can: monitor a weight signal output by the scale 142; detect placement of a vessel (e.g., a coffee mug, an espresso cup) on the scale 142 based on a change in the weight signal; and trigger the actuator 109 to advance the piston in the brew chamber 114 until the weight signal indicates an increase in weight on the scale 142 that corresponds to dispensation of a target controlled volume of coffee (e.g., 100 milliliters) into the vessel. Therefore, in this variation, the controller 130 can modulate motion of the actuator 109 motion based on weight of dispensed coffee rather than based on swept volume of the piston.

In one implementation, the scale 142 is removable and separately operable from the system 100, such as for use as a kitchen scale 142. In this implementation, the scale receptacle can include a charge receptacle; and the scale 142 can be battery operated and can include a charge port configured to engage the charge receptacle in response to insertion of the scale 142 onto the scale receptacle. The scale 142 can thus charge its internal battery via the charge receptacle when the scale 142 is installed in the scale receptacle under the brew assembly 110.

In the foregoing implementation, the system 100 can also include a wireless communication module coupled to the controller 130 and configured to wirelessly receive a weight signal from the scale 142. The system 100 can further include a display 152: arranged on the column 104; configured to render a brew parameter during the brew cycle; and configured to render a weight value received from the scale 142 in response to removal of the scale 142 from the scale receptacle. More specifically, in this implementation, the display 152 can render content related to an upcoming, ongoing, or recent brew cycle, options for configuration of brew parameters, or system settings, etc. by default when the scale 142 is loaded into the scale receptacle. However, when the scale 142 is removed from the scale receptacle, the controller 130 can: disable brew cycle operation; and update the display 152 to render weight values received wirelessly from the scale 142. The system 100 can therefore: function as a remote display for the scale 142 when the scale 142 is removed from the scale receptacle; and function as an integrated coffee brewing machine configured to dispense metered volumes of coffee when the scale 142 is installed in the scale receptacle.

Additionally or alternatively, the system 100 can include a drip tray 140: arranged in the base; and configured to catch liquid released from the portafilter 118 or water reservoir 112 and not caught by a vessel arranged below the portafilter 118. The drip tray 140 can also be contiguous with or otherwise define the scale receptacle and can locate the scale 142 offset above liquid caught from the portafilter 118 or water reservoir 112 above.

9. Controller+Brew Cycle

Figure 5:
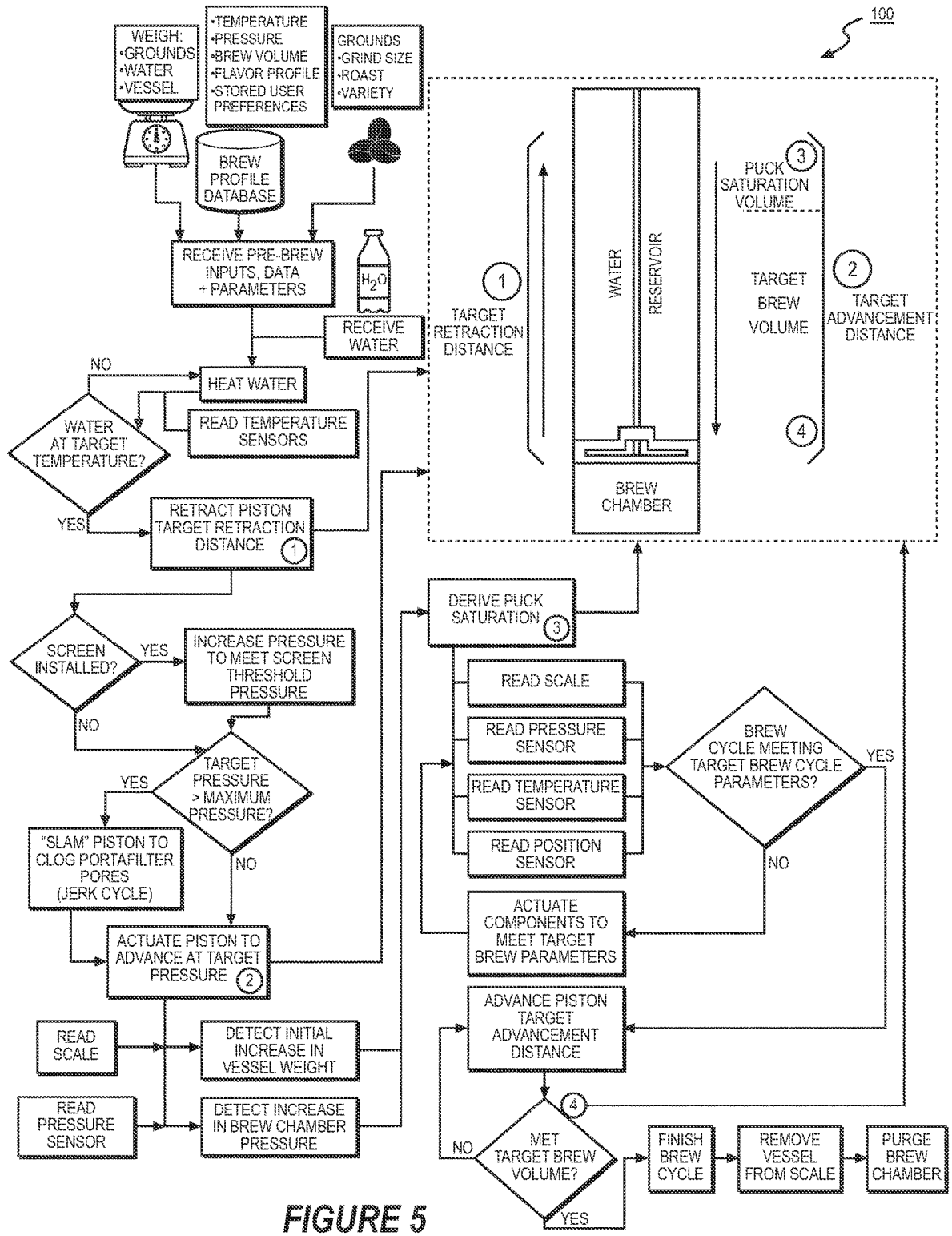
FIG. 5 is a block diagram representation of one variation of the system.

As shown in FIG. 5, the controller 130 is configured to execute a brew cycle, such as according to stored or retrieved brew parameters. In particular, a user may: load coffee grounds into the portafilter 118; fill the water reservoir 112—with the piston fully advanced to the bottom of the brew chamber 114—with water; select a brew recipe, brew profile, or other input (e.g., via the display 152 and user interface 150 or by scanning coffee bean or coffee ground packaging) associated with a set of brew parameters; and then initiate a brew cycle (e.g., via the user interface 150).

Based on the brew recipe, brew profile, or other input from the user, the controller 130: retrieves a target brew volume for the brew cycle (i.e., target liquid dispense volume from the portafilter 118 upon conclusion of the brew chamber 114); retrieves a target pre-brew temperature, a target brew temperature, and/or a target bloom temperature for the brew cycle; retrieves or calculates a piston retraction distance that corresponds to a swept volume of the piston equal to a target bloom volume for the brew cycle; retrieves or calculates a piston advancement distance that corresponds to a swept volume of the piston equal to the target brew volume for the brew cycle; retrieves a target brew pressure and/or bloom pressure in the brew chamber 114 during the brew cycle; and/or retrieves a target bloom duration.

The controller 130 then implements these brew parameters to output the target brew volume of coffee by: selectively actuating the heating element 116 to heat water in the water reservoir 112 and/or the brew chamber 114; triggering the actuator 109 to selectively retract the piston by the piston retraction distance to load water into the brew chamber 114; modulating a position of the piston in the brew chamber 114 via the actuator 109 to control pressure in the brew chamber 114; and triggering the actuator 109 to selectively advance the piston by the piston advancement distance to dispense the target brew volume of liquid from the brew chamber 114 to complete the brew cycle.

9.1 Piston Travel Distance(s)

In one implementation, the controller 130: retrieves a target brew volume (e.g., from a stored or retrieved brew recipe), from a selection entered by a user via the user interface 150; and calculates a target piston travel distance—that corresponds to a piston swept volume equal to the target brew volume—by dividing the target brew volume by a stored cross-sectional area of the piston. During a brew cycle, the controller 130 thus: triggers the actuator 109 to retract the piston by this target piston travel distance to transfer a volume of water equal to the target brew volume from the water reservoir 112, through the fill port, and into the brew chamber 114; and then (e.g., immediately thereafter or following a dwell period equal to bloom duration specified in the brew parameters) triggers the actuator 109 to advance the piston by the target piston travel distance to dispense the target brew volume of liquid—less a volume of water absorbed by coffee grounds occupying the portafilter 118—from the portafilter 118.

In another implementation, the controller 130: retrieves a target brew volume; and retrieves a nominal water saturation volume of coffee grounds occupying the portafilter 118 (e.g., one milliliter of water per two grams of coffee grounds; 20 milliliters of water per charge of coffee grounds). The controller 130 then calculates a target piston swept volume based on a sum of the target brew volume and the nominal water saturation volume; and transforms the piston swept volume into a target piston travel based on the stored cross-sectional area of the piston. During a brew cycle, the controller 130 thus: triggers the actuator 109 to retract the piston by this target piston travel distance to transfer a volume of water equal to a sum of the target brew volume and the nominal water saturation volume from the water reservoir 112, through the fill port, and into the brew chamber 114; and then triggers the actuator 109 to advance the piston by the target piston travel distance to dispense the target brew volume of liquid from the portafilter 118.

9.2 Standard Brew Cycle with Bloom Period and without Screen

In one implementation, the controller 130 triggers the actuator 109 to drive the piston to the bottom of the brew chamber 114 at the end of each brew cycle. In preparation for a next "standard" brew cycle, a user loads the water reservoir 112 with water. At the start of the brew cycle, the controller 130: activates the heating element 116 to heat this volume of water to a target pre-brew temperature (e.g., 90-96° C., 195-205° F.); and monitors the temperature of this volume of water via the (upper) temperature sensor 134. Then, in response to this volume of water reaching the target pre-brew temperature, the controller 130: triggers the actuator 109 to retract the piston 120 upwardly by the target piston travel (or the target piston retraction distance), thereby inducing vacuum in the brew chamber 114, opening the valve 124, and drawing a volume of water—equal to the swept volume of the piston—into the brew chamber 114 and into contact with coffee grounds occupying the brew chamber 114.

The controller 130 then: initiates a bloom timer for a bloom duration; monitors a temperature in the brew chamber 114 via the (lower) temperature sensor 134; and implements closed-loop controls to maintain a temperature in the brew chamber 114 at a target bloom temperature by selectively activating the heating element 116. For example, the controller 130 can: retrieve a target pre-brew temperature and a target bloom temperature; activate the heating element 116 to heat the volume of water occupying the water reservoir 112; trigger the actuator 109 to retract the piston upwardly to draw water from the water reservoir 112 into the brew chamber 114 in response to the temperature of the volume of water in the water reservoir 112 approaching the target pre-brew temperature (e.g., as detected in a first temperature signal output by the upper temperature sensor 134 described above); selectively activate the heating element 116 to maintain liquid occupying the brew chamber 114 proximal the bloom temperature during a bloom period (e.g., based on a second temperature signal output by the lower temperature sensor 134 described above); and then trigger the actuator 109 to advance the piston downwardly to displace liquid from the brew chamber 114 in response to completion of the bloom period.

In this implementation, the controller 130 can also monitor a pressure in the brew chamber 114 directly via the pressure sensor 136 during the bloom period. Alternatively, the controller 130 can: trigger the actuator 109 to oscillate the piston over a very short throw (e.g., 0.5 millimeter, 0.020"); monitor force output of the actuator 109, and implement methods and techniques described above to transform these force outputs of the actuator 109 into a pressure in the brew chamber 114. The controller 130 can then implement closed-loop controls to maintain the pressure in the brew chamber 114 at a target brew pressure by selectively triggering the actuator 109 to advance the piston when the pressure drops below the target brew pressure and retracting or stopping the piston when the pressure exceeds the target brew pressure.

Upon expiration of the bloom timer (e.g., 0-30 seconds), the controller 130 triggers the actuator 109 to advance the piston downwardly toward the portafilter 118 by the target piston travel (or by the target advancement distance) to dispense the target brew volume from the portafilter 118 and into a vessel below. Furthermore, the controller 130 can: implement methods and techniques described above to monitor pressure in the brew chamber 114 while advancing the piston; and implement closed-loop controls to maintain a target brew pressure (or the target bloom pressure) in the brew chamber 114 by modifying a speed of the actuator 109—and therefore a speed of the piston running in the brew chamber 114.

For example, during the brew cycle, the controller 130 can: access the target brew pressure; monitor a pressure signal output by the pressure sensor 136; trigger the actuator 109 to advance the piston downwardly toward the portafilter 118 at an initial speed; detect a first pressure in the brew chamber 114 at a first time based on the pressure signal received from the pressure sensor 136; reduce the initial speed of the actuator 109 to a first speed in response to the first pressure exceeding the target brew pressure; detect a second pressure in the brew chamber 114 at a second time based on the pressure signal received from the pressure sensor 136; and increase the first speed to a second speed in response to the second pressure falling below the target brew pressure. Therefore, the controller 130 can modulate a speed of the actuator 109 while a) advancing the piston toward the portafilter 118 to maintain the target brew pressure within the brew chamber 114 and b) displacing liquid from the brew chamber 114.

Then, in response to the piston reaching the bottom of the brew chamber 114, the controller 130 can conclude the brew cycle.

9.2 Brew Cycle without Bloom Period and with Screen

In another implementation, at the start of a brew cycle (e.g., an "espresso brew chamber 114 with screen"), the controller 130: activates the heating element 116 to heat the volume of water in the water reservoir 112 to a target brew temperature (e.g., 90° C., 194° F.); and monitors the temperature of this volume of water via the temperature sensor 134 in the piston. Then, in response to this volume of water reaching the target brew temperature, the controller 130: triggers the actuator 109 to retract the piston 120 upwardly by the target piston travel (or the target piston retraction distance), thereby inducing vacuum in the brew chamber 114, opening the valve 124, and drawing a volume of water—equal to the swept volume of the piston—into the brew chamber 114 between the piston and the screen 119.

The controller 130 then: triggers the actuator 109 to advance the piston downwardly toward the screen 119 to force water through the screen 119, across the portafilter 118, and into contact with coffee grounds in the portafilter 118. As water enters the volume between the screen 119 and the portafilter 118, this water displaces air out of the portafilter 118. A pressure required to displace air through the portafilter 118 (and to compress air remaining in the portafilter 118) may be significantly less than a pressure required to displace water through the portafilter 118 (and to compress water in the portafilter 118). Therefore, a force (or torque) output of the actuator 109 needed to move the piston at a nominal speed may increase and a pressure in the brew chamber 114 may similarly increase once water fully displaces air from the portafilter 118, fills the volume between the screen 119 and portafilter 118, and thus saturates coffee grounds in the portafilter 118. Accordingly, the controller 130 can detect an instant that water fills the portafilter 118 (and thus detect saturation of the coffee grounds, or a "saturation event") based on an increase in force or torque output of the actuator 109, an increase in current draw or back-EMF of the actuator 109, and/or an increase in pressure in the brew chamber 114.

The controller 130 can then: detect or interpret a saturation position of the piston at the instant of this saturation event; and trigger the actuator 109 to advance the piston downwardly from this position by a further target advancement distance corresponding to a piston swept volume equal to the target brew volume, thereby displacing (exactly) the target brew volume from the portafilter 118.

In one example, during a brew cycle, the controller 130: accesses or calculates a target advancement distance (or a target piston travel distance) corresponding to a piston swept volume approximating a target brew volume; and triggers the actuator 109 to advance the piston downwardly toward the portafilter 118. Then, based on a pressure signal received from the pressure sensor 136 arranged in the piston, the controller 130: detects a first pressure in the brew chamber 114 when the piston occupies a first piston position at a first time; and detects a second pressure in the brew chamber 114 when the piston occupies a second piston position, below the first piston position, at a second time succeeding the first time. Then, in response to a pressure difference between the first pressure and the second pressure exceeding a threshold pressure difference, the controller 130: detects saturation of coffee grounds occupying the portafilter 118 at the second time; and triggers the actuator 109 to advance the piston downwardly to a third position, offset below the second position by the target advancement distance, to dispense the target brew volume of liquid from the portafilter 118.

Furthermore, while advancing the piston over this target advancement distance, the controller 130 can also: implement methods and techniques described above to monitor pressure in the brew chamber 114 while advancing the piston; and implement closed-loop controls to maintain a target brew pressure in the brew chamber 114 by modifying a speed of the actuator 109—and therefore a speed of the piston running in the brew chamber 114. Then, in response to the piston reaching the target advancement distance below the saturation position in the brew chamber 114, the controller 130 can conclude the brew cycle.

9.3 High-Pressure Brew Cycle

In one variation, the controller 130 executes a high-pressure brew cycle by creating a high-impulse shock in the brew chamber 114—between piston retraction and piston advancement periods—in the standard brew cycle without screen, thereby driving coffee grounds into pores in the portafilter 118, temporarily clogging these pores, increasing a pressure required to displace liquid through the portafilter 118 during the subsequent piston advancement period, and increasing a maximum brew pressure achievable in the brew chamber 114 during the brew cycle.

In one implementation, during a brew cycle, the controller 130: triggers the actuator 109 to retract the piston 120 upwardly to draw water from the water reservoir 112, through the valve 124, and into the brew chamber 114; then triggers the actuator 109 to advance the piston 120 downwardly over a first distance (e.g., 1 millimeter) toward the portafilter 118 at a first speed (e.g., 5 centimeters per second) and over a first time duration (e.g., 0.2 second) to drive coffee grounds into pores defined by the portafilter 118; and then triggers the actuator 109 to advance the piston 120 downwardly toward the portafilter 118 over the target advancement distance (e.g., 5 centimeters) at a second speed (e.g., 0.5 centimeters per second) and over a second time duration (e.g., 10 seconds) to dispense liquid from the brew chamber 114 through the portafilter 118.

The controller 130 can therefore create a high-impulse shock in the brew chamber 114 in order to clog pores in the portafilter 118—and thus increase a maximum achievable pressure in the brew chamber 114 during a brew cycle—by rapidly advancing the piston 120 over a short distance within the brew chamber 114. The controller 130 can execute this process before a bloom period in order to enable the system 100 to achieve a greater brew chamber 114 pressure during a subsequent bloom period. Alternatively, if brew parameters for the coffee specify a low-pressure bloom period followed by high-pressure dispense, the controller 130 can: implement methods and techniques described above to maintain the brew chamber 114 at a target bloom pressure after loading water into the brew chamber 114; then create a high-impulse shock in the brew chamber 114 following completion of the bloom period and before advancing the piston 120 to dispense liquid from the brew chamber 114.

In a similar variation, the controller 130 similarly executes a high-pressure brew cycle by creating a high-impulse shock in the brew chamber 114—following a saturation event—in the brew cycle with screen, thereby driving coffee grounds into pores in the portafilter 118, temporarily clogging these pores, increasing a pressure required to displace liquid through the portafilter 118 during the subsequent piston advancement period, and increasing a maximum brew pressure achievable in the brew chamber 114 during the brew cycle.

The controller 130 can therefore selectively create a high-impulse shock in the brew chamber 114 in order to increase maximum achievable brew pressure in the brew chamber 114 in response to brew parameters—selected by the user, read from product packaging, or otherwise loaded by the controller 130—specifying a high-pressure brew chamber 114 or specifying a target brew pressure greater than a nominal maximum brew pressure associated with the portafilter 118.

9.4 Weight-Based Dispense Control

In one variation described above in which the system 100 includes a scale 142, the controller 130 can: calculate or retrieve a piston retraction distance corresponding to a piston swept volume that loads a volume of water greater than (e.g., 20% greater than) a target brew volume (i.e., a total volume of coffee dispensed by the system 100 upon completion of a brew chamber 114); trigger the actuator 109 to retract the piston 120 by this piston retraction distance during a brew chamber 114; then trigger the actuator 109 to advance the piston 120; monitor a weight signal output by the scale 142 while the actuator 109 advances the piston 120; interpret a volume or weight of coffee dispensed into a vessel—loaded onto the scale 142—based on this weight signal; and trigger the actuator 109 to cease advancement of the piston 120 in response to this volume or weight of coffee dispensed reaching the target brew volume.

The controller 130 can then: detect removal of the vessel from the scale 142 in response to the weight signal indicating a decrease in weight on the scale 142 (e.g., return to a tare weight); and then purge remaining liquid from the brew chamber 114.

In this variation, the system 100 can also detect first dispense of liquid from the portafilter (eg a "first drop") in response to the the weight signal output by the scale 142 indicating an increase in weight on the scale 142. The system can then: implement methods and techniques described herein displace the piston by a further downward distance to sweep the piston through a volume that corresponds to a target brew volume for the brew cycle; and/or modify a speed of the actuator, such as: to slow the piston and thus slow a dispense rate from the brew chamber for wider flavor extraction; or to accelerate the piston and thus increase a dispense rate from the brew chamber for narrower, more controlled flavor extraction from the coffee grounds.

9.5 Brew Chamber Purge

In one variation, the controller 130 purges remaining liquid from the brew chamber 114 following completion of the brew cycle.

In one implementation, the controller 130 can detect placement of a first vessel (e.g., a coffee mug, an espresso cup) under the portafilter 118 in response to a first change in the weight signal received from the scale 142. Then, following detection of placement of the first vessel under the portafilter 118, the controller 130 can: trigger the actuator 109 to retract the piston 120 to load water from the water reservoir 112 into the brew chamber 114; and then trigger the actuator 109 to advance the piston 120—such as to a dispense position or by a target advancement distance as described above—to displace liquid from the brew chamber 114, through the portafilter 118, and into the first vessel. The controller 130 can then: detect removal of the first vessel in response to a second change (i.e., a decrease) in the weight signal received from the scale 142; and detect placement of a second vessel (e.g., a drip tray 140, a purge vessel) under the portafilter 118 in response to a third change (i.e., an increase) in the weight signal received from the scale 142. Following detection of placement of the second vessel under the portafilter 118, the controller 130 can trigger the actuator 109 to advance the piston 120 from its current position (e.g., the dispense position) to a purge position (i.e., a maximum advancement position of the position) to displace remaining liquid from the brew chamber 114, through the portafilter 118, and into the second vessel.

In the foregoing implementation, the water reservoir 112 can be configured to store a maximum water volume less than twice a maximum swept volume of the piston 120 between the purge position and a maximum retracted position in the brew chamber 114. Accordingly, following detection of placement of the second vessel under the portafilter 118, the controller 130 can trigger the actuator 109 to retract the piston 120 to the maximum retracted position to transfer remaining water in the water reservoir 112 into the brew chamber 114. The controller 130 can then trigger the actuator 109 to advance the piston 120 to the purge position, thereby: displacing remaining liquid from the brew chamber 114, through the portafilter 118, and into the second vessel; and compressing and drying coffee grounds occupying the portafilter 118.

The user may then remove the portafilter 118 from the brew assembly 110 and discard the spent coffee grounds before returning the portafilter 118 to the brew assembly 110.

9.5 Dynamic Pressure v. Flow Rate

As described above, the controller 130 can control pressure in the brew chamber 114 during a brew cycle by controlling velocity (or "advancement rate") and/or position of the piston 120 in the brew chamber 114. For example, the controller 130 can implement an isobaric brew cycle with variable (e.g., dynamic) piston velocity and liquid dispense rate. In this implementation, the controller 130 can also implement a maximum piston velocity corresponding to a maximum liquid dispense rate that yields laminar (or otherwise smooth) flow of liquid from the portafilter 118. The controller 130 can similarly implement a minimum piston velocity that corresponding to a maximum contact duration of water and coffee grounds in the brew chamber 114 during a brew cycle.

Conversely, the controller 130 can implement a constant piston velocity—and therefore a variable brew chamber 114 pressure—during a portion or all of the brew cycle, such as to achieve a consistent or target initial dispense rate from the portafilter 118.

9.6 Controller: Pressure Adjustment Vis. Flavor Profile

In one implementation, the system 100 can dynamically control and adjust pressure of the piston 120 during a brew cycle for a flavor profile-based brew cycle. More specifically, the system 100 can receive an input specifying a target flavor profile of a brewed volume of coffee, such as: "sweet"; "acidic"; and/or "bitter." The system 100 can then derive target brew parameters, such as brew pressure, and/or a brew cycle duration based on the target flavor profile. For example, in response to receiving input of a target flavor profile (e.g., "acidic"), the controller 130 can: during the brew cycle, trigger the actuator 109 to drive the piston 120 downward within the brew chamber 114 at a first target pressure (e.g., 13 bar) for a first time interval (e.g., 15 seconds); and trigger the actuator 109 to drive the piston 120 downward within the brew chamber 114 at a second target pressure (e.g., 11 bar) different from the first target pressure for a second interval of time (e.g., 5 seconds). In this example, during a second brew cycle, in response to receiving input of a second target flavor profile (e.g., "bitter), the controller 130 can dynamically derive and adjust pressure settings for different time intervals during the second brew cycle to brew a volume of coffee exhibiting the second target flavor profile. Thus, the system 100 can calibrate a set of settings (e.g., pressure inside of the brew chamber 114, flow rate, temperature) and brew durations based on target flavor profiles characteristic of coffee to extract various flavor profiles from the coffee grounds.

10. Grinder

In one variation, the system 100 can communicate with a grinder (e.g., a coffee grinder) to identify coffee ground characteristics. More specifically, the system 100 can communicate with a grinder to receive a set of coffee ground characteristics descriptive of the coffee grounds contained in the portafilter 118, such as: a roast type (e.g., dark roast, light roast); a grind profile based on a numerical scale 142 (e.g., "1"—fine, "5"—coarse"); and/or a mass of coffee grounds (e.g., 6-8 grams or 1.5-2 tsp). The system 100 can then adjust a set of brew parameters, such as: a brew cycle duration; a set of brew pressures; a flow rate of water; and/or a target brew temperature, based on the set of coffee ground characteristics received from the grinder. For example, the controller 130 can: receive a grind profile parameter, descriptive of a grind size, from a grinder; receive a weight parameter, descriptive of a weight of coffee grounds in the portafilter 118, from the grinder; and, during a brew cycle, derive a set of target brew parameters (e.g., target pressure, target temperature, and target flow rate) based on the grind profile parameter and the weight parameter. Therefore, the system 100 can reduce or eliminate error from manual calibration of brew parameters based on user-derived measurements and estimations of the coffee grounds for the brew cycle.

In one implementation, the system 100 includes: a water tank configured to store and heat water prior to loading into the brew chamber; and a pump configured to transfer water from the water tank ito the water reservoir 112. For example, the water tank can be arranged in the column, and the controller 130 can trigger the pump to transfer a volume of water from the water tank into the water reservoir 112 in response to activation of a brew cycle.

In another example, the controller 130 is configured to communicate wirelessly with a grinder and receive, from the grinder: a coffee ground profile; a coffee ground weight; and/or a coffee ground volume. The controller 130 can then derive a set of target brew parameters for a brew cycle based on the coffee ground profile, the coffee ground weight, and/or the coffee ground volume.

11. Water Tank

In another variation, the system 100 includes: a water tank configured to store and heat water prior to loading into the brew chamber; and a pump configured to transfer water from the water tank ito the water reservoir 112. For example, the water tank can be arranged in the column, and the controller 130 can trigger the pump to transfer a volume of water from the water tank into the water reservoir 112 in response to activation of a brew cycle.

12. User Interface

In one implementation, the system 100 can include a user interface 150 including a knob 154 and a display 152. More specifically, the system 100 can include: a display 152 (e.g., an LCD screen) on the front face of the column 104 adjacent the rocker box 106; and a knob 154 arranged below the display 152 and configured to rotate between a set of positions (e.g., angles of rotation).

For example, the controller 130 can select: a first setting based on a first depression of the knob 154 at a first angle of rotation; and a second setting based on a second depression of the knob 154 at a second angle of rotation. In this example, for each angle of rotation, the display 152 can depict a new setting or performance metric (e.g., a current pressure metric, a current water temperature, a piston 120 displacement, a flow rate, a brew cycle timer, a weight of the vessel on the drip tray 140).

More specifically, the system 100 can interface with a user via the user interface 150 to set target brew parameters for a brew cycle, such as: a target brew pressure or variable brew profile; a target brew temperature; a target pre-brew temperature; a target brew or bloom duration; and/or a brew volume; etc. The system 100 can then automatically execute these brew parameters during a subsequent brew cycle. The system 100 can then store these target brew parameters in local memory and repeat these target brew parameters in subsequent brew cycles when selected by a user via the user interface 150.

In a similar implementation, the user interface 150 includes a display 152 arranged on the column 104 and a knob 154 arranged on the column 104 and configured to rotate between a set of positions. The controller 130 can then present a set of brew parameters via the display 152, load brew parameters based on a selection entered manually via the knob 154, and render confirmation of these brew parameters via the display 152.

In another example, the system can raise or lower the piston, tare the scale, and/or start, end, or pause a brew cycle based on inputs to the user interface 150.

In one variation, the system 100 wirelessly communicates with a mobile device, such as a tablet or a cellphone, as the user interface 150 in order to adjust brew parameters and remotely view system 100 performance metrics. In this implementation, the system 100 can communicate with a mobile application via a mobile device (e.g., a tablet, a phone) to select settings of a brew cycle. For example, during a brew cycle, a user can load the portafilter 118 with a volume of coffee grounds. Once the portafilter 118 is installed in the brew assembly 110, the system 100 can receive, via the mobile application associated with the system 100, a set of target brew parameters for the brew cycle, such as: a target flavor profile; a brew cycle start time; and/or a brew concentration. Thus, during the brew cycle, the system 100 can remotely calibrate brew parameters according to the set of target brew parameters based on user preferences.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can include a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A system comprising:
   a base defining a scale receptacle;
   a scale configured to transiently locate in the scale receptacle and to output a weight signal; and
   a rocker arm;
   a column supporting the rocker arm above the base;
   a brew assembly:
     supported on the column between the base and the rocker arm; and
     comprising:
       a water reservoir configured to store a first volume of water;
       a brew chamber extending below and contiguous with the water reservoir;
       a set of mating features arranged below the brew chamber opposite the water reservoir; and
       a portafilter configured to transiently couple to the set of mating features;
   a piston:
     configured to run in the brew chamber;
     coupled to the rocker arm;
     defining a fill port extending between the water reservoir and the brew chamber; and
     comprising a valve coupled to the fill port and operable in:
       a closed position during downward advancement of the piston within the brew chamber; and
       an open position during upward retraction of the piston within the brew chamber;
   an actuator:
     arranged in the column; and
     coupled to the rocker arm;
   a heating element:
     arranged in the brew assembly; and
     configured to heat the first volume of water occupying the brew assembly;
   a temperature sensor configured to output a temperature signal representing a temperature of the first volume of water occupying the brew assembly; and
   a controller configured to:
     activate the heating element;
     in response to the temperature of the first volume of water reaching a target temperature, trigger the actuator to retract the piston to transfer water from the water reservoir through the fill port and into the brew chamber; and
     trigger the actuator to advance the piston to displace liquid from the brew chamber and through the portafilter toward the base;
     access the weight signal from the scale seated in the scale receptacle while the actuator advances the piston to displace liquid from the brew chamber;
     calculate a dispense volume of liquid from the portafilter based on the weight signal; and
     trigger the actuator to cease advancement of the piston in response to the dispense volume reaching a target brew volume.

2. The system of claim 1:
   wherein the rocker arm comprises:
     a pivot mounted to the column;
     a first end coupled to the actuator; and
     a second end coupled to the piston via a connecting rod; and
   wherein the controller is configured to:
     access a target brew pressure;
     track a pressure in the brew chamber based on:
       a force output of the actuator;
       a cross-sectional area of the piston; and
       distances between the pivot, the first end, and the second end of the rocker arm; and modulate a speed of the actuator while advancing the piston to maintain the target brew pressure within the brew chamber and displace liquid from the brew chamber.

3. The system of claim 1, wherein the valve comprises a straight-through check-valve:
arranged in the piston and fluidly coupled to the fill port;
configured to transition into the closed position in response to an increase in pressure in the brew chamber during downward advancement of the piston; and
configured to transition into the open position in response to a decrease in pressure in the brew chamber during upward retraction of the piston.

4. The system of claim 1:
wherein the scale receptacle comprises a charge receptacle;
wherein the scale comprises a charge port configured to engage the charge receptacle in response to insertion onto the scale receptacle; and
further comprising:
a wireless communication module coupled to the controller and configured to wirelessly receive the weight signal from the scale; and
a display:
arranged on the column;
configured to render a brew parameter during the brew cycle; and
configured to render a weight value received from the scale in response to removal of the scale from the scale receptacle.

5. The system of claim 1:
wherein the water reservoir is configured to store a maximum water volume less than twice a maximum swept volume of the piston between the purge position and a maximum retracted position in the brew chamber; and
wherein the controller is configured to, following placement of a vessel under the portafilter:
trigger the actuator to retract the piston to the maximum retracted position to transfer remaining water in the water reservoir into the brew chamber; and
trigger the actuator to advance the piston to the purge position:
to displace remaining liquid from the brew chamber, through the portafilter, and into the second vessel; and
to compress and dry coffee grounds occupying the portafilter.

6. The system of claim 1:
wherein the temperature sensor:
is arranged in the piston proximal an upper surface of the piston; and
is configured to output the temperature signal representing the temperature of the first volume of water occupying the water reservoir;
further comprising a lower temperature sensor:
is arranged in the piston proximal a lower surface of the piston; and
configured to output a second temperature signal representing a temperature of liquid occupying the brew chamber; and
wherein the controller is configured to:
access a target bloom temperature;
activate the heating element to heat the volume of water occupying the water reservoir;
in response to the temperature of the first volume of water approaching the target temperature, trigger the actuator to retract the piston upwardly to draw water from the water reservoir into the brew chamber;
during a bloom period, selectively activate the heating element to maintain liquid occupying the brew chamber proximal the target bloom temperature based on the second temperature signal; and
in response to completion of the bloom period, trigger the actuator to advance the piston downwardly to displace liquid from the brew chamber.

7. The system of claim 1:
wherein the piston further comprises a pressure port facing the brew chamber;
further comprising a pressure sensor:
arranged in the piston;
fluidly coupled to the pressure port; and
configured to output a pressure signal representing a pressure within the brew chamber between the piston and the portafilter; and
wherein the controller is configured to, during a brew cycle:
access a target brew pressure;
trigger the actuator to advance the piston downwardly toward the portafilter at an initial speed;
detect a first pressure in the brew chamber at a first time based on the pressure signal received from the pressure sensor;
in response to the first pressure exceeding the target brew pressure, reduce the initial speed to a first speed;
detect a second pressure in the brew chamber at a second time based on the pressure signal received from the pressure sensor; and
in response to the second pressure falling below the target brew pressure, increasing the first speed to a second speed.

8. The system of claim 1, further comprising a screen:
arranged in the brew chamber adjacent and above the portafilter; and
configured to:
prevent water from flowing from the brew chamber into the portafilter when pressure within the brew chamber remains below a threshold pressure and prior to downward advancement of the piston; and
distribute water, loaded between the piston and screen, across coffee grounds occupying the portafilter in response to pressure within the brew chamber exceeding the threshold pressure during downward advancement of the piston.

9. The system of claim 1, wherein the controller is configured to, during a brew cycle:
trigger the actuator to retract the piston upwardly to draw water from the water reservoir, through the valve, and into the brew chamber;
trigger the actuator to advance the piston downwardly toward the portafilter at a first speed and over a first time duration to drive coffee grounds into pores defined by the portafilter; and
trigger the actuator to advance the piston downwardly toward the portafilter at a second speed and over a second time duration to dispense liquid from brew chamber through the portafilter:
the second time duration greater than the first time duration; and
the second speed less than first speed.

10. The system of claim 1:
further comprising a pressure sensor configured to output a pressure signal representing a pressure within the brew chamber between the piston and the portafilter; and
wherein the controller is configured to, during a brew cycle:
   access a target piston travel distance corresponding to a piston swept volume approximating a target brew volume;
   trigger the actuator to advance the piston downwardly toward the portafilter;
   based on the pressure signal received from the pressure sensor:
      detect a first pressure in the brew chamber when the piston occupies a first piston position at a first time; and
      detect a second pressure in the brew chamber when the piston occupies a second piston position, below the first piston position, at a second time succeeding the first time; and
   in response a pressure difference between the first pressure and the second pressure exceeding a threshold pressure difference:
      detect saturation of coffee grounds occupying the portafilter at the second time; and
      trigger the actuator to advance the piston downwardly to a third position, offset below the second position by the target piston travel distance, to dispense the target brew volume of liquid from the portafilter.

11. A system comprising:
a base;
a brew assembly:
   supported over the base; and
   comprising:
      a water reservoir configured to store a first volume of water;
      a brew chamber extending below and contiguous with the water reservoir;
      a set of mating features arranged below the brew chamber opposite the water reservoir; and
      a portafilter configured to transiently couple to the set of mating features;
a piston:
   configured to run in the brew chamber;
   defining a fill port extending between the water reservoir and the brew chamber; and
   comprising a valve coupled to the fill port and operable in:
      a closed position during downward advancement of the piston within the brew chamber; and
      an open position during upward retraction of the piston within the brew chamber;
an actuator:
   coupled to the piston;
a heating element:
   arranged in the brew assembly; and
   configured to heat the first volume of water occupying the brew assembly;
an upper temperature sensor:
   arranged in the piston proximal an upper surface of the piston; and
   configured to output a first temperature signal representing a temperature of the first volume of water occupying the water reservoir;
a lower temperature sensor:
   arranged in the piston proximal a lower surface of the piston; and
   configured to output a second temperature signal representing a temperature of liquid occupying the brew chamber; and
a controller configured to:
   access a target bloom temperature;
   activate the heating element to heat the volume of water occupying the water reservoir;
   in response to the first temperature of the first volume of water approaching the target bloom temperature, trigger the actuator to retract the piston upwardly to draw water from the water reservoir through the fill port and into the brew chamber; and
   during a bloom period, selectively activate the heating element to maintain liquid occupying the brew chamber proximal the target bloom temperature based on the second temperature signal; and
   in response to completion of the bloom period, trigger the actuator to advance the piston downwardly to displace liquid from the brew chamber and through the portafilter.

12. The system of claim 11, wherein the controller is configured to:
   access a target piston travel distance corresponding to a piston swept volume yielding a target brew volume;
   trigger the actuator to retract the piston by the target piston travel distance to transfer water from the water reservoir through the fill port and into the brew chamber; and
   trigger the actuator to advance the piston by the target piston travel distance to dispense the target brew volume of liquid from the portafilter.

13. The system of claim 12:
further comprising a user interface:
   arranged on the column and configured to receive the target brew volume; and
wherein the controller is configured to:
   retrieve a nominal water saturation volume of coffee grounds occupying the portafilter;
   calculate the piston swept volume based on a sum of the target brew volume and the nominal water saturation volume; and
   transform the piston swept volume into the target piston travel based on a cross-sectional area of the piston.

14. The system of claim 11:
wherein the base defines a scale receptacle;
further comprising a scale configured to transiently seat in the scale receptacle and to output a weight signal; and
wherein the controller is configured to, during a brew cycle:
   access the weight signal from the scale seated in the scale receptacle while the actuator advances the piston to displace liquid from the brew chamber;
   calculate a dispense volume of liquid from the portafilter based on the weight signal; and
   trigger the actuator to cease advancement of the piston in response to the dispense volume reaching a target brew volume.

15. The system of claim 14, wherein the controller is configured to:
   detect placement of a first vessel under the portafilter in response to a first change in the weight signal received from the scale;
   following detection of placement of the first vessel under the portafilter:

trigger the actuator to advance the piston to a dispense position to displace liquid from the brew chamber, through the portafilter, and into the first vessel;

detect removal of the first vessel in response to a second change in the weight signal received from the scale; and following detection of placement of a second vessel under the portafilter:

trigger the actuator to advance the piston from the dispense position to a purge position to displace remaining liquid from the brew chamber, through the portafilter, and into the second vessel.

16. A system comprising:

a base;

a brew assembly:

supported over the base; and comprising:

a water reservoir configured to store a first volume of water;

a brew chamber extending below and contiguous with the water reservoir;

a set of mating features arranged below the brew chamber opposite the water reservoir; and a portafilter configured to transiently couple to the set of mating features;

a piston:

configured to run in the brew chamber;

defining a fill port extending between the water reservoir and the brew chamber; and comprises a pressure port facing the brew chamber;

comprising a valve coupled to the fill port and operable in:

a closed position during downward advancement of the piston within the brew chamber; and an open position during upward retraction of the piston within the brew chamber;

an actuator:

arranged in the column; and coupled to the rocker arm;

a heating element:

arranged in the brew assembly; and configured to heat the first volume of water occupying the brew assembly;

a temperature sensor configured to output a temperature signal representing a temperature of the first volume of water occupying the brew assembly;

a pressure sensor:

arranged in the piston;

fluidly coupled to the pressure port; and configured to output a pressure signal representing a pressure within the brew chamber between the piston and the portafilter; and a controller configured to:

access a target brew pressure;

activate the heating element;

in response to the temperature of the first volume of water reaching a target temperature, trigger the actuator to retract the piston, at an initial speed, to transfer water from the water reservoir through the fill port and into the brew chamber; and detect a first pressure in the brew chamber at a first time based on the pressure signal received from the pressure sensor;

in response to the first pressure exceeding the target brew pressure, reduce the initial speed to a first speed;

detect a second pressure in the brew chamber at a second time based on the pressure signal received from the pressure sensor; and in response to the second pressure falling below the target brew pressure, increase the first speed to a second speed; and trigger the actuator to advance the piston to displace liquid from the brew chamber and through the portafilter toward the base.

\* \* \* \* \*